(12) United States Patent
Matsumoto et al.

(10) Patent No.: US 7,789,527 B2
(45) Date of Patent: Sep. 7, 2010

(54) BACKLIGHT DEVICE AND COLOR LIQUID CRYSTAL DISPLAY

(75) Inventors: Tatsuhiko Matsumoto, Tokyo (JP); Koichiro Kakinuma, Tokyo (JP); Takehiro Nakatsue, Kanagawa (JP); Shuichi Haga, Kanagawa (JP)

(73) Assignee: Sony Corporation, Tokyo (JP)

( * ) Notice: Subject to any disclaimer, the term of this patent is extended or adjusted under 35 U.S.C. 154(b) by 384 days.

(21) Appl. No.: 11/596,098

(22) PCT Filed: Apr. 28, 2005

(86) PCT No.: PCT/JP2005/008180

§ 371 (c)(1), (2), (4) Date: Nov. 9, 2006

(87) PCT Pub. No.: WO2005/109087

PCT Pub. Date: Nov. 17, 2005

(65) Prior Publication Data

US 2008/0036943 A1 Feb. 14, 2008

(30) Foreign Application Priority Data

May 11, 2004 (JP) .............................. 2004-141568

(51) Int. Cl.
*G02B 6/10* (2006.01)

(52) U.S. Cl. .................. 362/231; 362/612; 362/613

(58) Field of Classification Search ................. 362/231, 362/612, 613, 235

See application file for complete search history.

(56) References Cited

U.S. PATENT DOCUMENTS 5,475,512 A 12/1995 Nakazawa et al.

(Continued)

FOREIGN PATENT DOCUMENTS

DE 10 2004 023 186 A1 12/2005

(Continued)

OTHER PUBLICATIONS

Moriya, N. et al., "New Color Filter for Light-Emitting Diode Back Light", Japanese Journal of Applied Physics, Apr. 1, 2003, p. 1637-1641, vol. 42, No. 4A, Japan Society of Applied Physics, Tokyo, Japan.

(Continued)

*Primary Examiner*—Jong-Suk (James) Lee
*Assistant Examiner*—Leah S Lovell
(74) *Attorney, Agent, or Firm*—Wolf, Greenfield & Sacks, P.C.

(57) ABSTRACT

Disclosed is a backlight device which is used for a color liquid crystal display and includes a light source and a backlight housing (23). The light source includes a red light emitting diode (21R), radiating red light, having a peak wavelength λpr such that 625 nm≦λpr≦685 nm, a green light emitting diode (21G), radiating green light, having a peak wavelength λpg such that 505 nm≦λpg≦540 nm, and a blue light emitting diode (21B), radiating blue light, having a peak wavelength λpb such that 420 nm≦λpb≦465 nm. The backlight housing mixes the red light, the green light and the blue light, radiated from the light source, to generate white light. A light emission intensity is adjusted so that a half value width of a spectrum of the red light, a half value width of a spectrum of the green light and a half value width of a spectrum of the blue light are such that 20 nm≦hwr≦25 nm, 30 nm≦hwg≦40 nm and 25 nm≦hwb≦30 nm, respectively.

12 Claims, 17 Drawing Sheets

U.S. PATENT DOCUMENTS

| | | | |
|---|---|---|---|
| 6,055,033 A | 4/2000 | Yamaguchi et al. | |
| 6,580,476 B2 | 6/2003 | Hasegawa | |
| 6,633,301 B1 | 10/2003 | Dallas et al. | |
| 6,636,282 B2 | 10/2003 | Ogawa et al. | |
| 6,697,134 B2 | 2/2004 | Watanabe et al. | |
| 6,799,865 B2* | 10/2004 | Ellens et al. | 362/240 |
| 6,817,735 B2* | 11/2004 | Shimizu et al. | 362/231 |
| 7,184,110 B2 | 2/2007 | Kim et al. | |
| 7,201,493 B2* | 4/2007 | Martynov et al. | 362/231 |
| 7,213,960 B2* | 5/2007 | Yoo | 362/634 |
| 7,281,816 B2* | 10/2007 | Suzuki | 362/231 |
| 7,295,260 B2 | 11/2007 | Harayama et al. | |
| 7,324,080 B1* | 1/2008 | Hu et al. | 345/102 |
| 7,474,366 B2 | 1/2009 | Haga et al. | |
| 2001/0035853 A1 | 11/2001 | Hoelen et al. | |
| 2003/0063062 A1 | 4/2003 | Tsumura et al. | |
| 2005/0184952 A1 | 8/2005 | Konno et al. | |
| 2005/0219443 A1 | 10/2005 | Tanaka et al. | |
| 2006/0007111 A1 | 1/2006 | Moon et al. | |
| 2006/0007367 A1 | 1/2006 | Cho | |
| 2006/0152468 A1 | 7/2006 | Ozaki | |
| 2006/0164580 A1 | 7/2006 | Ueda et al. | |
| 2007/0297172 A1 | 12/2007 | Furukawa | |
| 2008/0100551 A1 | 5/2008 | Haga et al. | |
| 2008/0111960 A1 | 5/2008 | Yoshida et al. | |
| 2008/0129680 A1 | 6/2008 | Kimura et al. | |
| 2008/0174544 A1 | 7/2008 | Ueda et al. | |
| 2008/0186433 A1 | 8/2008 | Haga et al. | |
| 2008/0225197 A1 | 9/2008 | Maruyama et al. | |

FOREIGN PATENT DOCUMENTS

| | | | |
|---|---|---|---|
| EP | 1672706 A | 6/2006 | |
| EP | 1863009 A | 12/2007 | |
| JP | 10-260402 A | 9/1998 | |
| JP | 07-325214 A | 12/1998 | |
| JP | 11-183891 A | 7/1999 | |
| JP | 2001-135118 A | 5/2001 | |
| JP | 2001-272938 A | 10/2001 | |
| JP | 2002-99250 A | 4/2002 | |
| JP | 2003-131229 A | 5/2003 | |
| JP | 2003-207770 A | 7/2003 | |
| JP | 2003-228067 A | 8/2003 | |
| JP | 2003-233062 A | 8/2003 | |
| JP | 2003-532153 A | 10/2003 | |
| JP | 2003-331608 A | 11/2003 | |
| JP | 2004-118133 A | 4/2004 | |
| JP | 2004-212503 A | 7/2004 | |
| JP | 2004-246117 A | 9/2004 | |
| JP | 2005-091526 A | 4/2005 | |
| JP | 2005-100932 A | 4/2005 | |
| JP | 2005-234134 A | 9/2005 | |
| JP | 2005-242270 A | 9/2005 | |
| JP | 3766042 | 2/2006 | |
| JP | 2006-058484 A | 3/2006 | |
| JP | 2008-051905 A | 3/2008 | |
| JP | 2008-052131 A | 3/2008 | |
| JP | 2008-116914 A | 5/2008 | |
| JP | 2008-122713 A | 5/2008 | |
| WO | WO 01/84227 A1 | 11/2001 | |
| WO | WO 2006/006537 A1 | 1/2006 | |
| WO | WO 2007/141732 A | 12/2007 | |

OTHER PUBLICATIONS

Poynton, "Digital Video and HDTV, Algorithms and Interfaces", Jan. 1, 2003, pp. 203-207, 224; Morgan Kaufmann, San Francisco, CA, USA.

* cited by examiner

| color temperature | x | y | PW50 | B(450nm) | G(525nm) | R(640nm) |
|---|---|---|---|---|---|---|
| 9000k | (0.2869, 0.2956) | | 9000 | 437 – 464 (Δ27nm) | 512 – 546 (Δ34nm) | 625 – 646 (Δ21nm) |
| 10000k | (0.2806, 0.2883) | | 10000 | 437 – 464 (Δ27nm) | 512 – 546 (Δ34nm) | 625 – 646 (Δ21nm) |
| 11000k | (0.2757, 0.2824) | | 11000 | 437 – 464 (Δ27nm) | 512 – 546 (Δ34nm) | 625 – 646 (Δ21nm) |

FIG.10

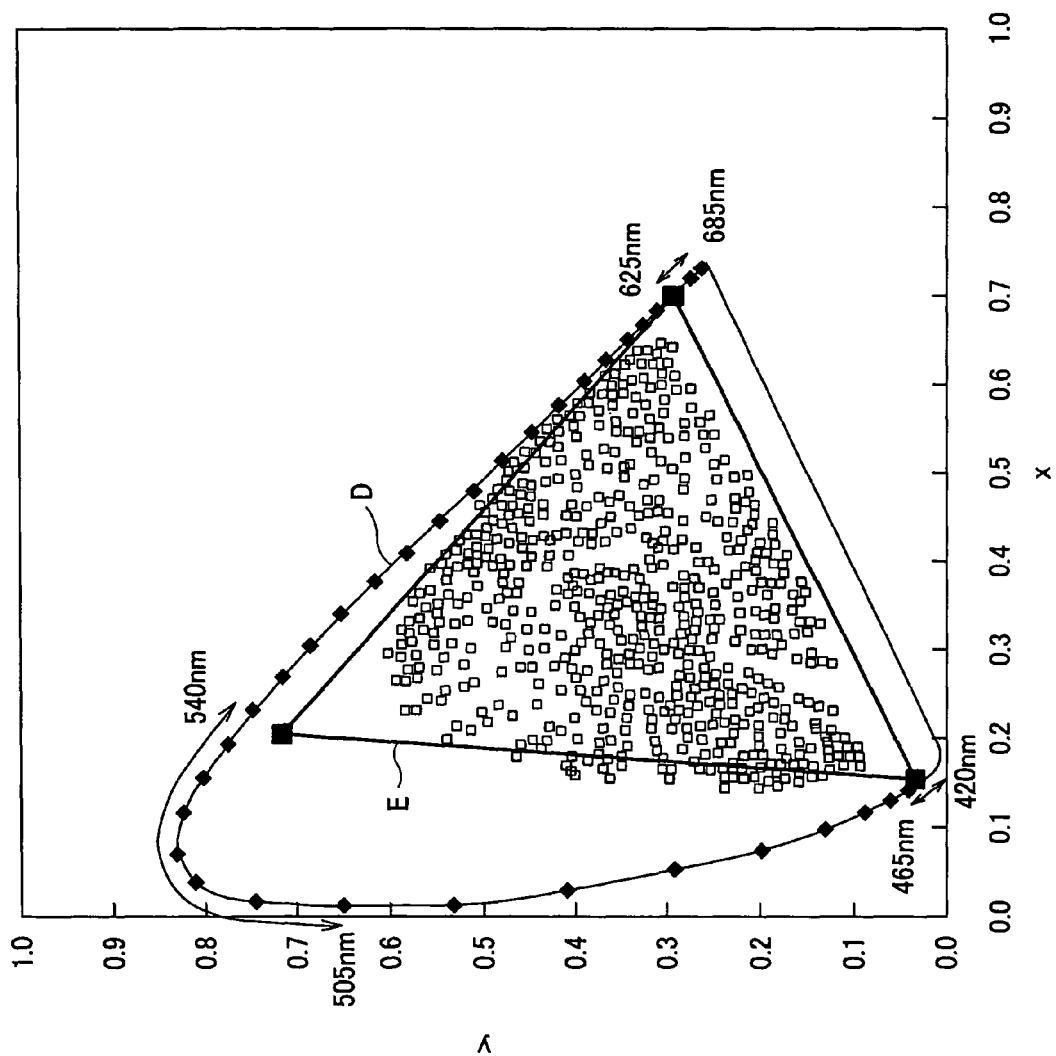

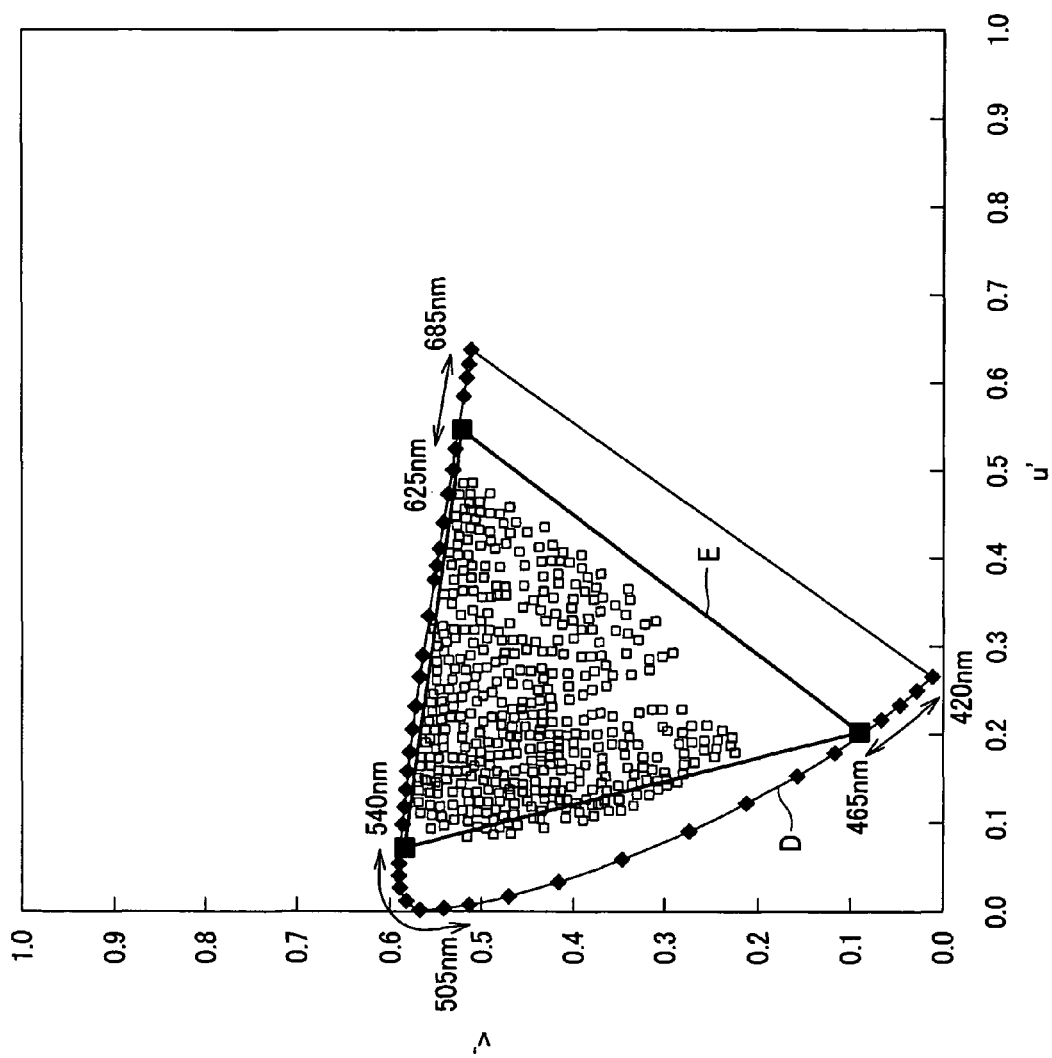

BACKLIGHT DEVICE AND COLOR LIQUID CRYSTAL DISPLAY

TECHNICAL FIELD

This invention relates to a backlight device, and to a color liquid crystal display (LCD) employing this backlight device.

The present invention contains subject matter related to Japanese Patent Application No. JP 2004-141568 filed in the Japanese Patent Office on May 11, 2004, the entire contents of which being incorporated herein by reference.

BACKGROUND ART

Nowadays, television receivers, employing liquid crystal display (LCD) or a plasma display panel (PDP), reduced in thickness as compared to a cathode ray tube (CRT), which has long been used since the start of television broadcasting, have been proposed, and are being put to use to take the place of the CRT. In particular, a color liquid crystal display, employing a color liquid crystal display panel, may be driven at low power consumption, and is available at costs which tend to become lower. Hence, the color liquid crystal display is promising as electrical display, and is felt to come into widespread use in accelerative fashion.

The color liquid crystal display is predominantly of the backlight system in which a transmissive color liquid display panel is illuminated from its back side for demonstrating a color picture. As a light source for a backlight device, a CCFL (Cold Cathode Fluorescent Lamp), emitting white light with the aid of a fluorescent tube, is now in use extensively.

DISCLOSURE OF THE INVENTION

Problems to be Solved by the Invention

In general, in a transmissive color liquid crystal display, a color filter, employing three prime color filters, made up by a blue filter CFB0 (450 nm), a green filter CFG0 (525 nm) and a red filter CFR (615 nm), having spectral characteristics shown in FIG. 1, is provided for each pixel of a color liquid crystal display panel.

On the other hand, the white light, emitted by a three wavelength CCFL used as a light source for a backlight device of a color liquid crystal device, has the spectrum shown in FIG. 1, and contains light rays of different intensities at different wavelength bands.

Hence, the colors reproduced by the combination of the backlight device, having the above-described three wavelength type CCFL, as the light source, and the color liquid crystal display panel, having the aforementioned color filter, are problematical in that they are extremely inferior in color purity.

FIGS. 3 and 4 show the color reproducing range of a color liquid crystal display provided with a backlight device having the above-described three wavelength type CCFL as a light source. FIGS. 3 and 4 depict the xy chromaticity diagram and the u'v' chromaticity diagram, respectively, prescribed by the Commission Internationale de l'Eclaiage (CIE).

The color reproducing range of the color liquid crystal display, provided with the backlight device, having the above-described three wavelength type CCFL as a light source, as shown in FIGS. 3 and 4, is narrower than a color reproducing range B as provided for in the standard of the NTSC (National Television System Committee) system, adopted as a color television broadcast system, and hence may not sufficiently cope with the current television broadcasting.

Meanwhile, a reference symbol C in FIGS. 3 and 4 represents the color reproducing range provided for by the Commission Internationale de l'Eclaiage (CIE).

On the other hand, it is feared that the CCFL may imperil the environment because mercury is contained in the fluorescent tube. Hence, there is raised a demand for a light source which may take the place of the CCFL as a light source for the backlight device. A light emitting diode is thought to be promising as a light source which may take the place of the CCFL. With the development of a blue light emitting diode, the light emitting diodes, emitting the red light, green light and the blue light, as three prime colors, are now in order. Hence, with the use of the light emitting diodes as the light sources of the backlight device, it may be expected that the color reproducing range may be extended to that prescribed in the NTSC system.

However, there persists the problem that the color reproducing range of the color liquid crystal display is not so broad as to satisfy the color reproducing range prescribed by the NTSC system.

The present invention has been made in order to overcome the aforementioned problem of the related art. The present invention has it as a technical task to provide a backlight device which allows for broadening the color gamut of the color liquid crystal display of the backlight system, and a color liquid crystal display provided with this backlight device.

A backlight device according to an embodiment of the present invention is adapted for illuminating a transmissive color liquid crystal display panel from a back side thereof, with white light, the transmissive color liquid crystal display panel including a color filter employing three color filters for transmitting red light, green light and blue light by wavelength selection, the backlight device including: a light source, including a red light emitting diode, radiating red light, having a peak wavelength $\lambda pr$ such that 625 nm$\leq\lambda pr\leq$685 nm, a green light emitting diode, radiating green light, having a peak wavelength $\lambda pg$ such that 505 nm$\leq\lambda pg\leq$540 nm, and a blue light emitting diode, radiating blue light, having a peak wavelength $\lambda pb$ such that 420 nm$\leq\lambda pb\leq$465 nm, and mixing means for color mixing the red light, the green light and the blue light, radiated from the light source, to generate white light; wherein a light emission intensity of the red light, the green light and the blue light, radiated from the red light emitting diode, the green light emitting diode and the blue light emitting diode, respectively, is adjusted so that a half value width hwr of a spectrum of the red light, a half value width hwg of a spectrum of the green light and a half value width hwb of a spectrum of the blue light are such that 20 nm$\leq$hwr$\leq$25 nm, 30 nm$\leq$hwg$\leq$40 nm and 25 nm$\leq$hwb$\leq$30 nm, respectively.

A color liquid crystal display according to an embodiment of the present invention includes a transmissive color liquid crystal display panel having a color filter employing three color filters for transmitting red light, green light and blue light by wavelength selection, and a backlight device for illuminating the color liquid crystal display panel from a back side thereof, with white light, wherein the backlight device includes: a light source, including a red light emitting diode, radiating red light, having a peak wavelength $\lambda pr$ such that 625 nm$\leq\lambda pr\leq$685 nm, a green light emitting diode, radiating green light, having a peak wavelength $\lambda pg$ such that 505 nm$\leq\lambda pg\leq$540 nm, and a blue light emitting diode, radiating blue light, having a peak wavelength $\lambda pb$ such that 420 nm$\leq\lambda pb\leq$465 nm, and mixing means for color mixing the red light, the green light and the blue light, radiated from the light source, to generate white light; and a light emission intensity of the red light, the green light and the blue light, radiated from the red light emitting diode, the green light emitting diode and the blue light emitting diode, respectively, is adjusted so that a half value width hwr of a spectrum of the red light, a half value width hwg of a spectrum of the green light and a half value width hwb of a spectrum of the blue light are such that 20 nm≦hwr≦25 nm, 30 nm≦hwg≦40 nm and 25 nm≦hwb≦30 nm, respectively.

The backlight device according to the present invention mixes the red light, the green light and the blue light, generated by the light source, made up by the red light emitting diode, radiating red light, having a peak wavelength λpr such that 625 nm≦λpr≦685 nm, the green light emitting diode, radiating green light, having a peak wavelength λpg such that 505 nm≦λpg≦540 nm, and the blue light emitting diode, radiating blue light, having a peak wavelength λpb such that 420 nm≦λpb≦465 nm, to generate white light. The backlight device radiates this white light on the transmissive color liquid crystal display panel from its back side. The transmissive color liquid crystal display panel includes a color filter employing three color filters adapted for transmitting red light, green light and blue light by wavelength selection.

In this manner, the color purity of the red light, the green light and the blue light, emitted by the red light emitting diode, the green light emitting diode and the blue light emitting diode, forming the light source, respectively, may be raised to provide for a broad color gamut of the white light obtained on color mixing. Hence, the color reproducing range, which will provide for not less than 100% of the NTSC (National Television System Committee) ratio, may be achieved.

Since the upper limit value of the range 625 nm≦λpr≦685 nm of the peak wavelength λpr of red light and the lower limit value of the range 420 nm≦λpb≦465 nm of the peak wavelength λpb of blue light take account of the relative spectral luminous efficacy, it is possible to maintain the power efficiency of the red light emitting diode and that of the blue light emitting diode at respective optimum values.

On the other hand, a light emission intensity of the red light, the green light and the blue light, radiated from the red light emitting diode, the green light emitting diode and the blue light emitting diode, respectively, is adjusted so that a color temperature of the white light is in a preset range, so as to set a half value width hwr of a spectrum of the red light, a half value width hwg of a spectrum of the green light and a half value width hwb of a spectrum of the blue light so that 20 nm≦hwr≦25 nm, 30 nm≦hwg≦40 nm and 25 nm≦hwb≦30 nm, respectively.

This allows the white balance to be set so that the desired color temperature will be attained as sufficient luminance is maintained.

Other objects and advantages to be derived from the present invention will become more apparent from the embodiments of the present invention which will now be explained with reference to the drawings.

BRIEF DESCRIPTION OF THE DRAWINGS

FIG. 10 is a diagram showing a half value width of the spectrum of each of the red light, green light and the blue light, shown in FIG. 9, for each of desired color temperatures.

FIG. 16 is a graph showing the narrowest color reproducing range as specified by the present invention, and also plotting sets of coordinate values of a color chart, which is based on the Munsell color cascade, in the xy chromaticity diagram of the XYZ color system.

FIG. 17 is a graph showing the narrowest color reproducing range as specified by the present invention, and also plotting sets of coordinate values of a color chart, which is based on the Munsell color cascade, in the u'v' chromaticity diagram of the XYZ color system.

BEST MODE FOR CARRYING OUT THE INVENTION

The best mode for carrying out the present invention will now be described in detail with reference to the drawings.

It should be noted that the present invention is not limited to the embodiments hereinafter explained and may be modified as appropriate without departing from the purport of the invention.

Figure 5:
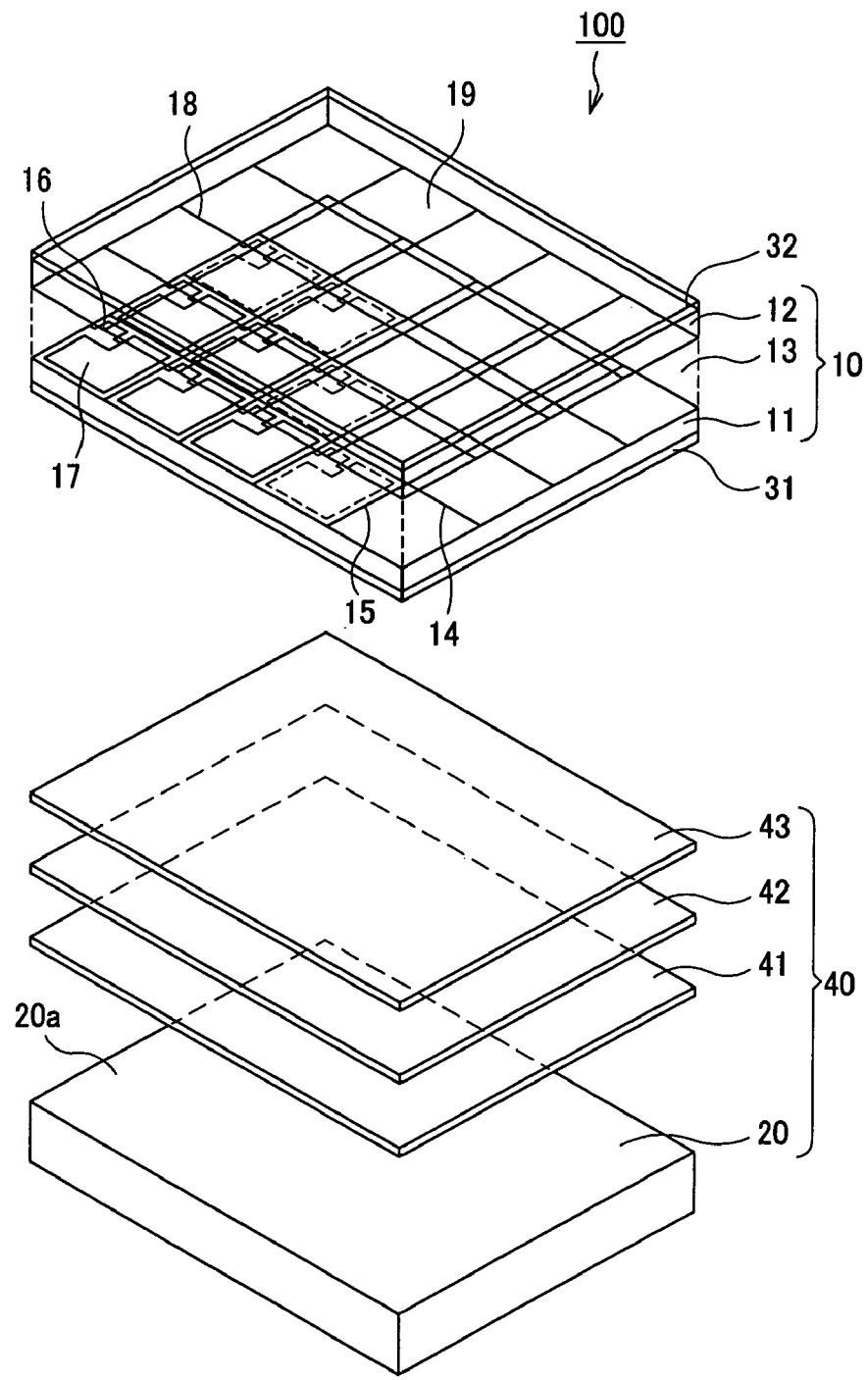
FIG. 5 is an exploded perspective view of a color liquid crystal display according to an embodiment of the present invention.

The present invention is applied to a color liquid crystal display 100 of the backlight system shown for example in FIG. 5.

This color liquid crystal display 100 is made up of a light transmissive color liquid crystal display panel 10 and a backlight unit 40 provided on the back side of the color liquid crystal display 100. This color liquid crystal display 100 may be provided with an analog tuner, not shown, for receiving the ground wave or the satellite wave, as necessary, and a receiver, also not shown, employing a digital tuner. The color liquid crystal display may also be provided with a picture signal processor and an audio signal processor, not shown, for processing the picture signals and audio signals, captured by the receiver, respectively. The color liquid crystal display may further be provided with an audio signal outputting section, also not shown, employing a loudspeaker for outputting audio signals processed by an audio signal processor.

This light transmissive color liquid crystal display panel 10 includes a TFT substrate 11 and a counter-electrode substrate 12, both of which are transparent substrates formed of glass and which are arranged facing each other. The light transmissive color liquid crystal display panel also includes a liquid crystal layer 13 enclosed in a space between the two substrates and which is formed of, for example, a twisted nematic (TN) liquid crystal. The TFT substrate 11 is provided with a number of signal lines 14 and a number of scanning lines 15, arranged in a matrix pattern. The TFT substrate is also provided with a number of thin-film transistors 16, as switching elements, arranged at the points of intersection of the signal lines 14 and the scanning lines 15, and also with a number of pixel electrodes 17. The thin-film transistors 16 are sequentially selected by the scanning lines 15 to write picture signals, supplied from the signal lines 14, in associated ones of the pixel electrodes 17. On the other hand, a number of counter electrodes 18 and a number of color filter sections 19 are formed on the inner surface of the counter-electrode substrate 12.

Figure 6:
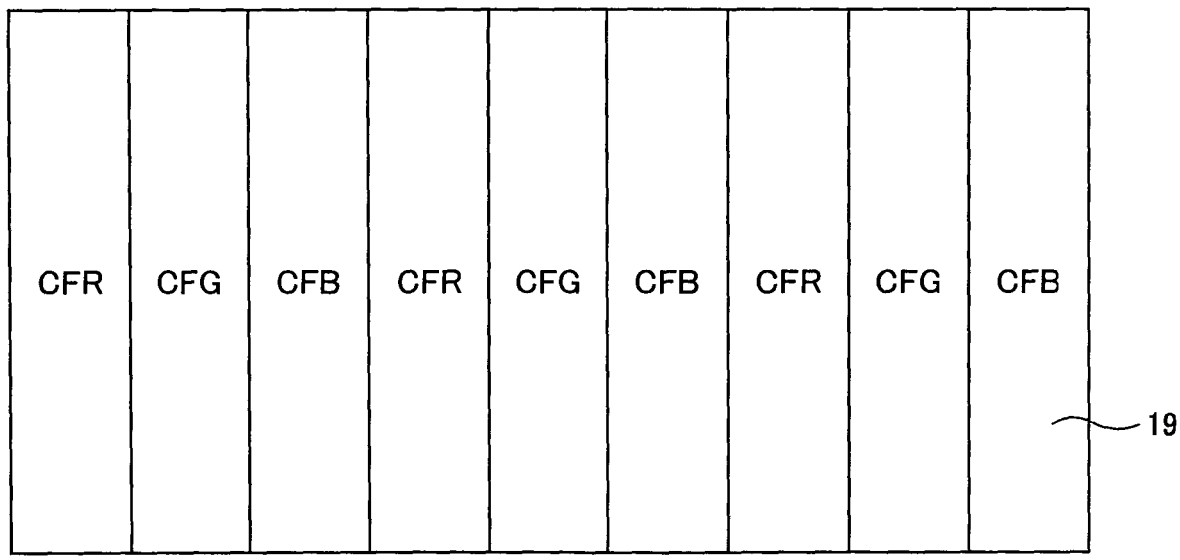
FIG. 6 is a plan view showing respective color filters of a color liquid crystal display panel provided to the color liquid crystal display.

The color filter sections 19 will now be explained. Each color filter section 19 is divided into groups of plural segments, each group being associated with each pixel. For example, each group is divided into three segments, namely a red filter CFR, a green filter CFG and a blue filter CFB, for three prime colors, as shown for example in FIG. 6. The arraying patterns of the color filter segments may include a delta array or a square array, not shown, in addition to striped patterns shown in FIG. 6.

With the color liquid crystal display 100, the light transmissive color liquid crystal display panel 10, constructed as described above, is sandwiched between light polarizing plates 31, 32. The light transmissive color liquid crystal display panel is driven in accordance with an active matrix system, as white light is illuminated from its back side by the backlight unit 40, for demonstrating a desired full-color picture.

The backlight unit 40 illuminates the color liquid crystal display panel 10 from its back side. Referring to FIG. 5, the backlight unit 40 includes a backlight device 20, having light sources and adapted for radiating the white light, obtained on color mixing light beams, radiated from the light sources, from a light radiating surface 20a by surface light radiation. The backlight unit also includes a light diffusing plate 41, a luminance enhancing film 42 and a second light diffusing plate 43, arranged in this order on the light radiating surface 20a of the backlight device 20. The light diffusing plates 41, 43 diffuse the white light, radiated from the light radiating surface 20a, for equalizing the luminance in the surface light radiation. The luminance enhancing film 42 uplifts the white light beam, radiated from the light radiating surface 20a, along a line normal to the light radiating surface 20a, for enhancing the luminance in the surface light radiation.

Figure 7:
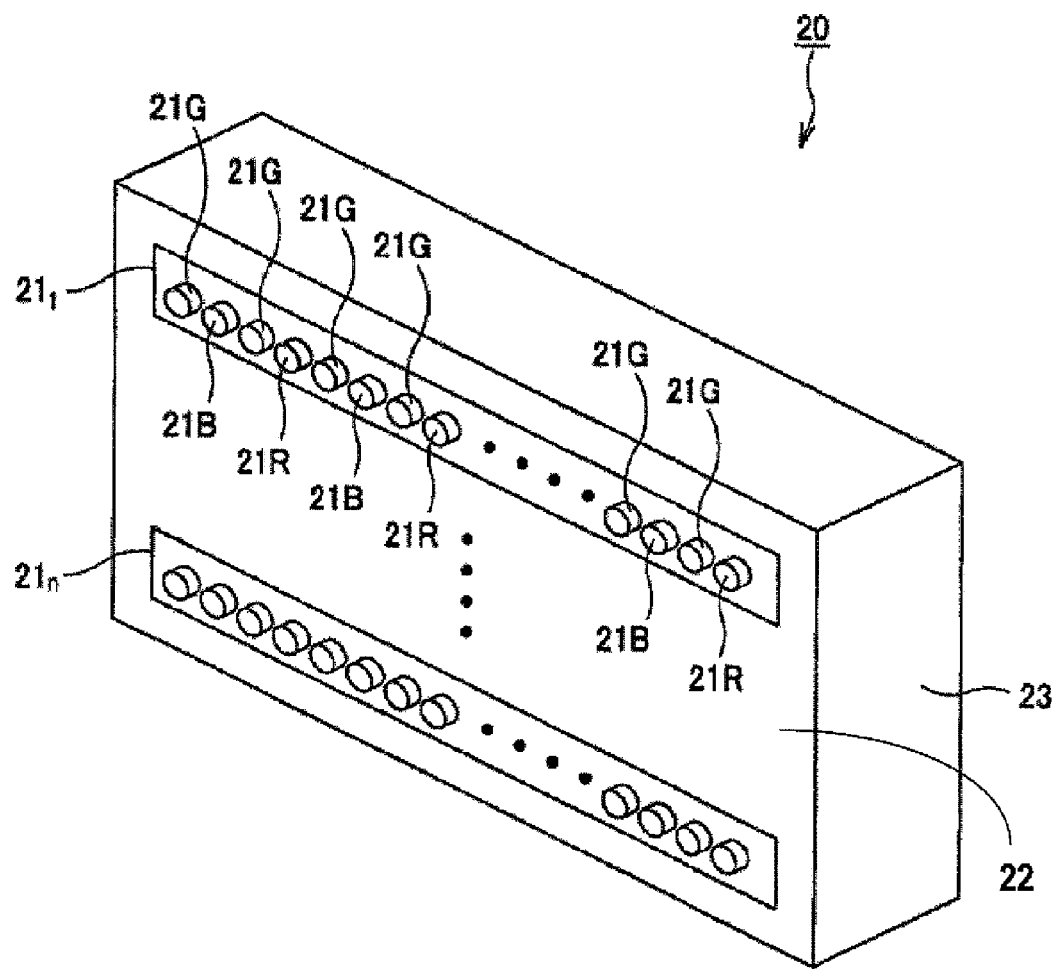
FIG. 7 is a perspective view showing a color liquid crystal display panel provided to the color liquid crystal display.

FIG. 7 schematically shows the structure of the backlight device 20. Referring to FIG. 7, the backlight device 20 uses, as light sources, a red light emitting diode 21R, radiating red light, a green light emitting diode 21G, radiating green light, and a blue light emitting diode 21B, radiating blue light. Meanwhile, if, in the following explanation, the red light emitting diode 21R, green light emitting diode 21G and the blue light emitting diode 21B are referred to collectively, these are referred to simply as light emitting diodes 21.

Referring to FIG. 7, the light emitting diodes 21 are arrayed on a substrate 22 in a line in a desired sequence to form a light emitting diode section 21n, where n is a natural number. The light emitting diodes are arranged on the substrate 22 in such a sequence that the green light emitting diodes 21G are arrayed in a line at equal intervals and the red and blue light emitting diodes 21R, 21B are alternately arrayed between neighboring green light emitting diodes 21G, as shown for example in FIG. 7.

A plural number of rows of the light emitting diode sections 21n are arranged within a backlight housing 23, operating as an enclosure of the backlight device 20, depending on the size of the color liquid crystal display panel 10 to be illuminated by the backlight unit 40.

The light emitting diode sections 21n are arranged in the backlight housing 23 so that the longitudinal direction of the light emitting diode sections 21n will be the horizontal direction, as shown in FIG. 7. Alternatively, the light emitting diode sections 21n may be arranged so that the longitudinal direction of the light emitting diode sections 21n will be the vertical direction, in a manner not shown. Still alternatively, the light emitting diode sections may be arrayed in accordance with the combination of the above two arraying modes.

The technique of arraying the light emitting diodes 21n so that the longitudinal direction thereof is the horizontal direction or the vertical direction is the same as the arraying manner for the CCFLs, so far used as light sources for the backlight device. Consequently, the designing know-how accumulated up to now may be utilized for reducing the cost or time needed for manufacture.

The light beams, emitted from the red light emitting diode 21R, green light emitting diode 21G and from the blue light emitting diode 21B, built into the backlight housing 23, are color mixed in the backlight housing 23 and turned into a white light beam. It is noted that optical components, such as lenses, prisms or reflective mirrors, are arranged for the light emitting diodes 21 so that the red light, green light and blue light radiated from the light emitting diodes 21 will be uniformly mixed in color in the backlight housing 23 for generating radiated light of high directivity.

The white light, radiated from the backlight device 20 in a state mixed in color, is illuminated on the color liquid crystal display panel 43 from its back side via light diffusing plate 41, luminance enhancing film 42 and second light diffusing plate 43.

Figure 8:
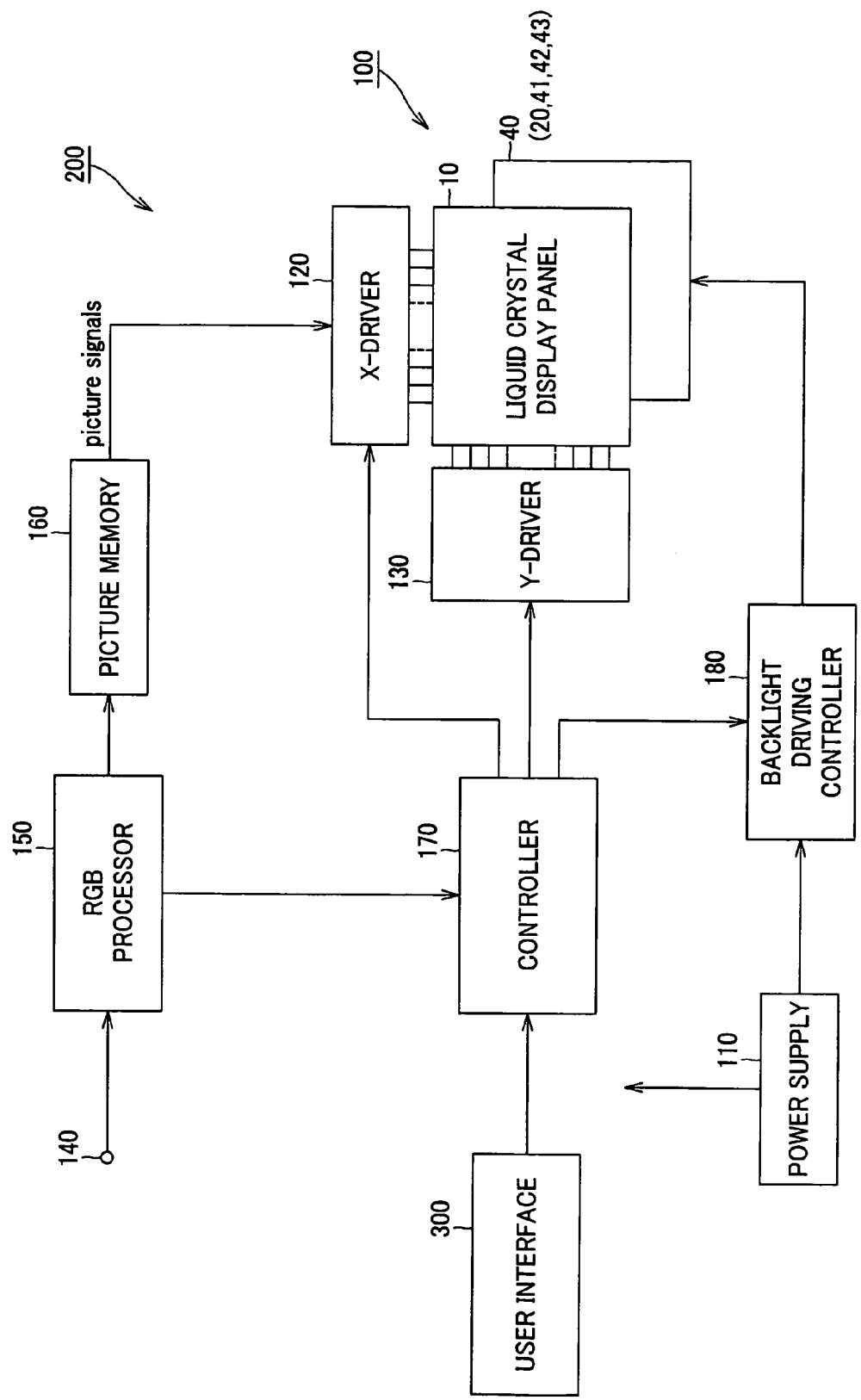
FIG. 8 is a block circuit diagram showing a driving circuit for driving a color liquid crystal display.

The color liquid crystal display 100 is driven by a driving circuit 200 shown for example in FIG. 8.

The driving circuit 200 includes a power supply section 110 for supplying the driving power for the color liquid crystal display panel 10 and the backlight device 20. The driving circuit also includes an X-driver 120 and a Y-driver 130 for driving the color liquid crystal display panel 10. The driving circuit also includes an RGB processor 150 supplied via input terminal 140 with picture signals from outside or with picture signals which are captured by a receiver, not shown, provided on the color liquid crystal display 100, and which are processed by a picture signal processor. The driving circuit also includes a picture memory 160 and a controller 170, both connected to this RGB processor 150, and a backlight driving controller 180 for driving and controlling the backlight device 20 of the backlight unit 40.

In the driving circuit 200, the picture signals, transmitted via input terminal 140, are processed with chroma processing by the RGB processor 150. Moreover, the picture signals are also converted from composite signals into RGB separate signals, suited for driving the color liquid crystal display panel 10. The RGB separate signals are supplied to the controller 170, while being supplied via picture memory 160 to the X-driver 120.

The controller 170 also controls the X-driver 120 and the Y-driver 130 at a preset timing in keeping with the separate RGB signals, and drives the color liquid crystal display panel 10 with the separate RGB signals, which are supplied via picture memory 160 to the X-driver 120, to display a picture corresponding to the separate RGB signals.

The backlight driving controller 180 generates pulse width modulated (PWM) signals, from the voltage supplied from the picture signals section 110, to drive the respective light emitting diodes 21, which are light sources for the backlight device 20. By and large, the color temperature has characteristics that it depends on the operating current. Thus, for acquiring desired luminance and nevertheless reproducing the color faithfully, that is, providing for a constant color temperature, it is necessary to drive the light emitting diodes 21, using the pulse width modulated signals, to suppress changes in color.

A user interface 300 is used for selecting a channel to be captured by the aforementioned receiver, not shown, adjusting the volume of the speech, output by an audio outputting section, not shown, adjusting the luminance of white light radiated from the driving circuit 200 for illuminating the color liquid crystal display panel 10, or for adjusting the white balance.

For example, in case a user has made luminance adjustment from the user interface 300, a luminance control signal is transmitted via controller 170 of the driving circuit 200 to the backlight driving controller 180. This backlight driving controller 180 is responsive to the luminance control signal to vary the duty ratio of the pulse width modulated signal for each of the red light emitting diode 21R, green light emitting diode 21G and the blue light emitting diode 21B, for driving and controlling the red light emitting diode 21R, green light emitting diode 21G and the blue light emitting diode 21B.

With the color liquid crystal display 100, embodying the present invention, the white balance of white light, radiated from the backlight device 20, is adjusted so that the color temperature will be 10000±1000 K (Kelvin). In order for the color temperature of white light, radiated from the backlight device 20, to be 10000±1000 K, it is necessary to change the intensity ratio of peak wavelengths of the red light, green light and the blue light, radiated by the red light emitting diode 21R, green light emitting diode 21G and the blue light emitting diode 21B, respectively, from a simple ratio of 1:1:1 to a certain preset ratio.

Figure 9:
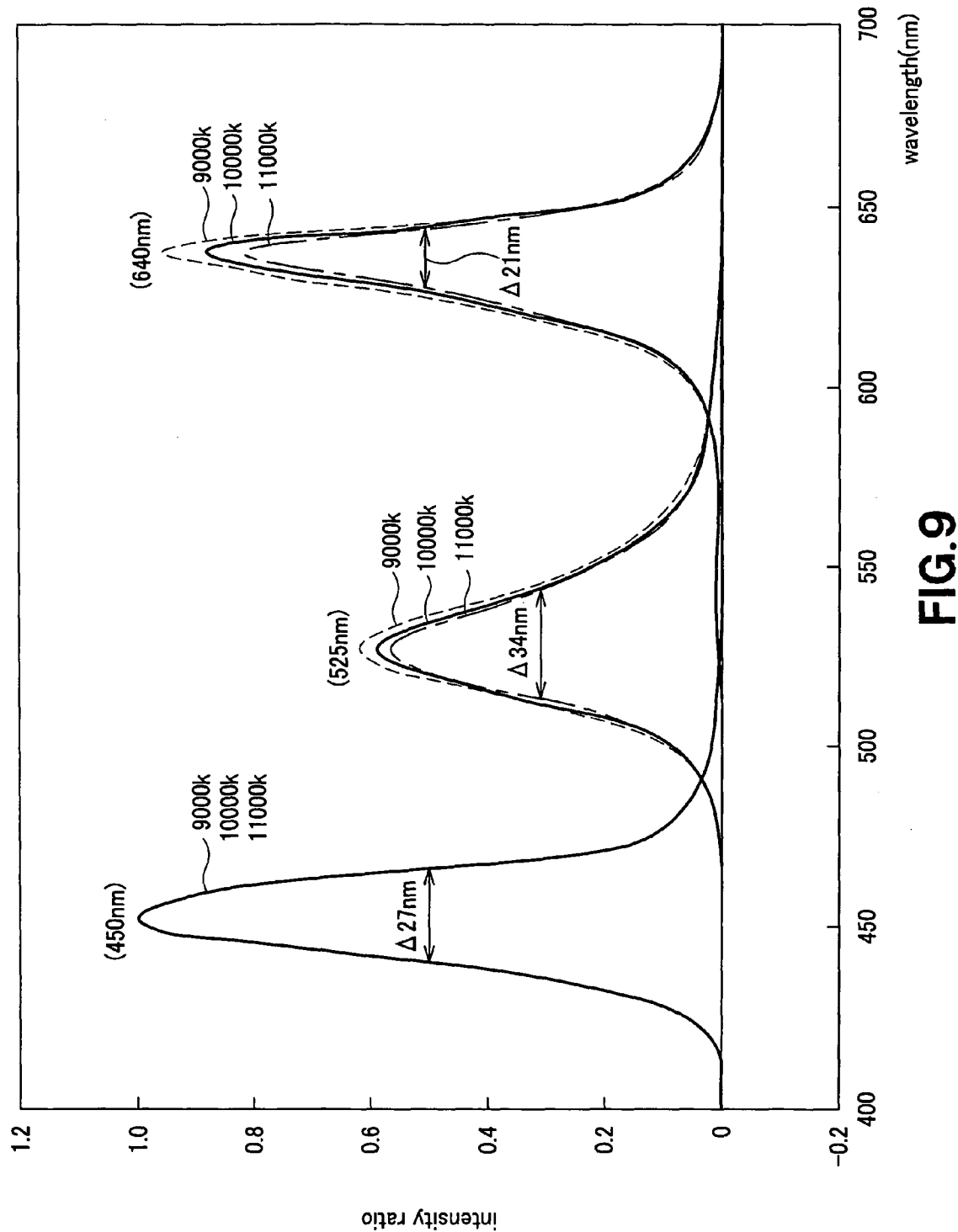
FIG. 9 is a graph showing the spectrum of each of red light, green light and blue light, emitted by the light emitting diodes, in case the white balance is set at a desired color temperature in a color liquid crystal display.

FIG. 9 shows the spectra of the intensity of the red light beam, green light beam and the blue light beam, having peak wavelengths of 640 nm, 525 nm and 450 nm, respectively, which will give the color temperature of the white light of 9000K, 10000K and 11000K. It is seen from FIG. 9 that the ratio of the peak intensities of the red light beam, green light beam and the blue light beam is approximately 0.9:0.6:1.

FIG. 10 specifies the results shown in FIG. 9 in terms of the half value widths of the respective wavelength light beams, for each of the color temperatures (9000K, 10000K and 11000K). In short, it may be said that, if the ratio of the peak intensities of the red light beam, green light beam and the blue light beam, emitted by the light emitting diodes of the backlight device 20, is set to 0.9:0.6:1, the color temperature of the white light is 10000±1000 K, for which the half value widths of the light beams of the respective wavelengths are 21 nm (for red light), 34 nm (for green light) and 27 nm (for blue light).

Thus, if the power of each of the red light emitting diode 21R, green light emitting diode 21G and the blue light emitting diode 21B of the backlight device 20 is adjusted so that the half value widths of the respective light beams, emitted by these light emitting diodes, will be 21 nm (for red light), 34 nm (for green light) and 27 nm (for blue light), the color temperature of the white light may be maintained within the aforementioned range of 10000±1000 K.

As a matter of fact, the half value widths of the spectrum of each of the red light, green light and the blue light, radiated from the red light emitting diode 21R, green light emitting diode 21G and the blue light emitting diode 21B, respectively, are slightly varied from one device to another, such as due to difference in production lots. Consequently, the half value widths for the red light, green light and the blue light are set so as to be in the ranges of $20\ nm \leq hwr \leq 25\ nm$, $30\ nm \leq hwg \leq 40\ nm$, and $25\ nm \leq hwb \leq 30\ nm$, respectively. It is noted that the aforementioned half width values are included within these ranges. With the half value widths within the above ranges, the color temperature of the white light may be maintained in the aforementioned range of 10000±1000 K. If desired to increase the luminance of white light, radiated from the backlight device 20, it is sufficient to select and use the light emitting diodes 21 having broader values of the half value widths insofar as the values of the half value widths of the light emitting diodes so selected and used are within the above ranges.

On the other hand, if broader values of the half value widths of the red light, green light and the blue light are desired, such light emitting diodes 21, having respective different peak wavelengths, may intentionally be selected and used within the peak wavelength ranges of the light emitting diodes 21 which will be explained subsequently. In an exemplary case of the green light emitting diode 21G, taken here for explanation, a plural number of green light emitting diodes 21G, having different values of the peak wavelengths $\lambda pg$, comprised within the peak wavelength range of the green light emitting diode 21G, as later explained, are intentionally selected and used as light sources. The green light beams, emitted by these green light emitting diodes, are mixed together in color such as to realize a broader half value width of the green light beam on the whole. For the other light beams, that is, the red light beam and the blue light beam, a plural number of the red light emitting diodes 21R and a plural number of the blue light emitting diodes 21B may intentionally be selected and used as light sources, respectively, such as to realize the broader half value widths of the green light beam and the red light beam on the whole.

It is required of the green light emitting diode 21G to be of an increased half value width, in particular from consideration of the relative spectral luminous efficacy as later explained. Thus, the possible range of the half value width of the spectrum of the green light beam, emitted by the green light emitting diode 21G, is set to $30\ nm \leq hwg \leq 40\ nm$, as described above. This range is broader by about 5 nm as compared to the red and blue light beams.

Figure 11:
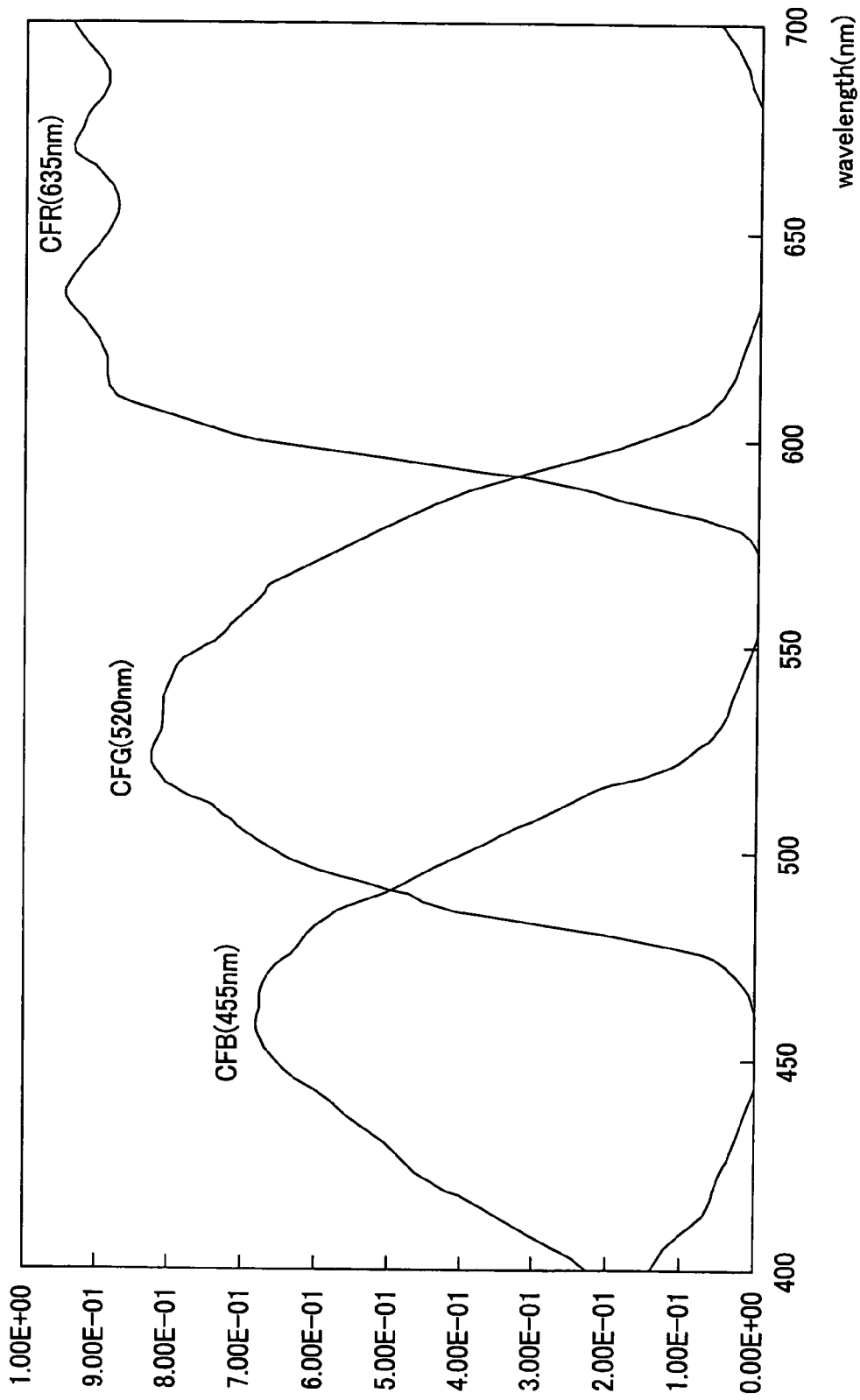
FIG. 11 is a graph showing spectral characteristics of respective color filters of a color liquid crystal display panel provided to a color liquid crystal display.

With the above-described structure of the color liquid crystal display 100, each color filter section 19, provided to the color liquid crystal display panel 10, is made up by a red filter CFR (635 nm), a green filter CFG (520 nm) and a blue filter CFB (455 nm), each being of spectral characteristics shown for example in FIG. 11. In this figure, the peak transmissive wavelengths of the respective filters are indicated in parentheses. The transmissive wavelength of the red filter CFR (635 nm) of the color filter section 19 is shifted by about 20 nm towards the long wavelength side, relative to that of the state-of-the-art red filter CFR (615 nm) shown in FIG. 14, so that, for assuring improved color purity and a broader color gamut, the wavelength range of the green light emitted by the green light emitting diode 21G will not affect that of the red light emitting diode 21R.

It should be noted that the wavelength range of the red light, emitted by the red light emitting diode 21R, is substantially determined by this shifted transmissive wavelength range of the red filter CFR. Hence, with the transmissive wavelength range of the red filter CFR, thus shifted towards the long wavelength, it is also possible to prevent the wavelength range of the red light from affecting the transmissive wavelength range of the green filter CFG.

Similar effects may be derived by shifting the blue filter CFB of the color filter section 19 towards the short wavelength side, although this case is not shown. It is then possible to assure improved color purity and a broader color gamut.

In illuminating the color liquid crystal display panel 10, having the above-described color filter section 19, with the backlight device 20, it is necessary to make proper selection of the wavelength ranges of the red light emitting diode 21R, green light emitting diode 21G and the blue light emitting diode 21B, as light sources, otherwise the color purity becomes poor to narrow the color gamut, as in the case of the CCFL explained in connection with the related art. Ideally, the peak wavelength of the red light, emitted by the red light emitting diode 21R, is shifted towards the long wavelength side, as much as possible, with the peak wavelength of the green light, emitted by the green light emitting diode 21G, as center, so that the red light will not be transmitted through the green light emitting diode CFG. In similar manner, the peak wavelength of the blue light, emitted by the blue light emitting diode 21B, is shifted towards the short wavelength side, as much as possible, so that the blue light will not be transmitted through the green light emitting diode CFG.

Figure 12:
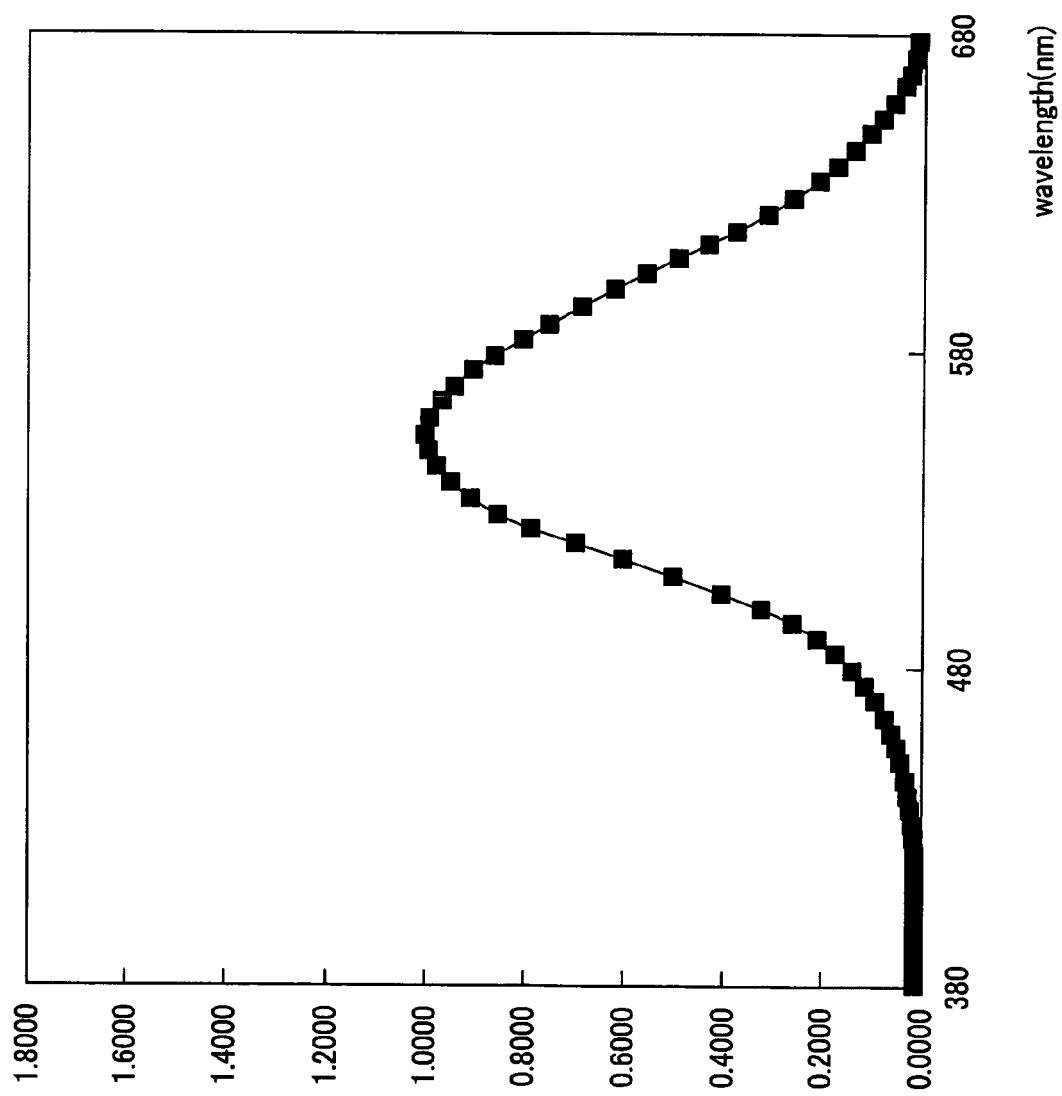
FIG. 12 is a graph showing the routine relative spectral luminous efficacy.

However, the sensitivity of the human eye to light (spectral luminous efficacy) differs with wavelengths, such that, referring to FIG. 12, the sensitivity reaches a peak at 555 nm, and becomes lower towards the long wavelength side and towards the short wavelength side. FIG. 12 depicts a relative spectral luminous efficacy curve, with 555 nm, corresponding to the peak of the spectral luminous efficacy, set to 1 (unity).

Thus, if the peak wavelength of the red light, emitted by the red light emitting diode 21R, and that of the blue light, emitted by the blue light emitting diode 21B, are shifted excessively towards the long wavelength side and towards the short wavelength side, respectively, the spectral luminous efficacy is lowered. Hence, if the spectral luminous efficacy is to be raised, it becomes necessary to apply an extremely high power.

Consequently, the peak wavelength of the red light, emitted by the red light emitting diode 21R, and that of the blue light, emitted by the blue light emitting diode 21B, are shifted only to such an extent that the power efficiency is not lowered, whereby it becomes possible to assure improved color purity and a broader color gamut.

In the following, such optimum peak wavelength ranges, which will assure high color purity and the broad color gamut, are to be determined. In this case, the optimum peak wavelength ranges are determined so that, in shifting the peak wavelength of the red light, emitted by the red light emitting diode 21R, that of the green light, emitted by the green light emitting diode 21G, and that of the blue light, emitted by the blue light emitting diode 21B, that is, in varying the wavelength ranges, the power efficiency will not be lowered.

Specifically, the peak wavelengths of the two light emitting diodes are fixed, and several light emitting diodes of the remaining diode type, having different peak wavelengths, are readied. As these light emitting diodes, having different peak wavelengths, are selectively assorted to the first stated two light emitting diodes, the NTSC (National Television System Committee) ratio is taken for each assorted set. The wavelength ranges in case the NTSC ratio has exceeded 100% are used as optimum wavelength ranges for light emission by the red light emitting diode 21R, green light emitting diode 21G and the blue light emitting diode 21B. The peak wavelengths of the red light and the blue light are set within the ranges for which the power efficiency as determined by the aforementioned spectral luminous efficacy is not lowered.

[Red Light Emitting Diode 21R]

Initially, the peak wavelengths of the blue light emitting diode 21B and the green light emitting diode 21G are fixed and plural red light emitting diodes 21R with respective different peak wavelengths are readied. The NTSC ratio is measured for each of the sets of the three light emitting diodes to find an optimum peak wavelength band for the red light emitting diode 21R.

Figure 13A:
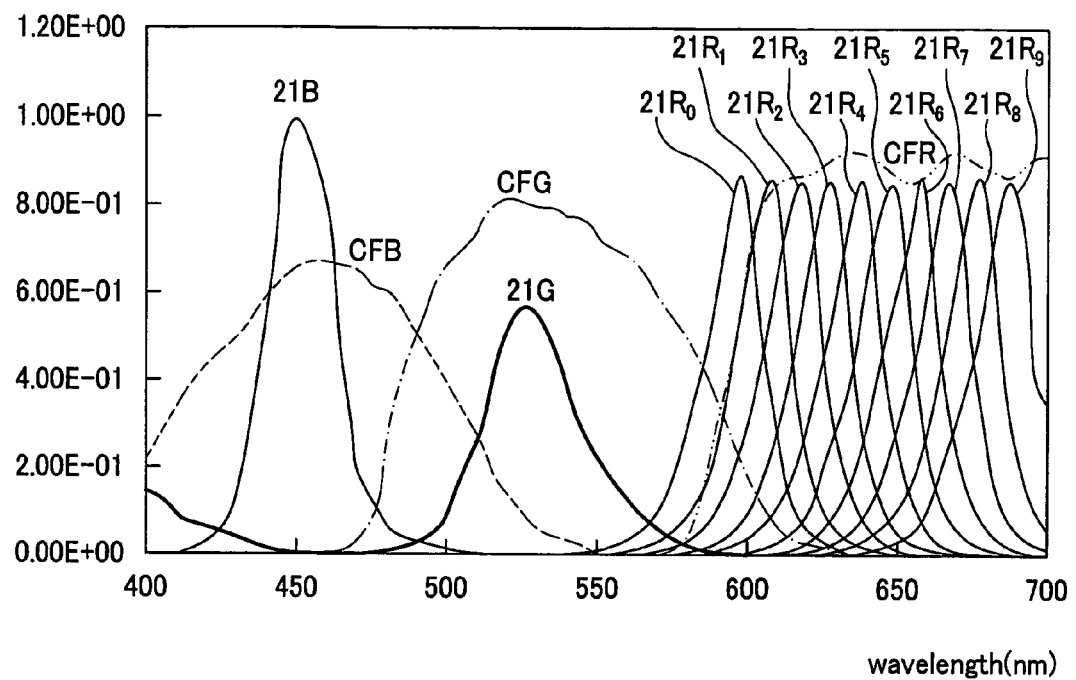
FIG. 13A is a graph showing spectral characteristics of each color filter and the spectrum of light radiated by each light emitting diode in case the peak wavelength band of a red light emitting diode is varied.

The graph of FIG. 13A shows spectral characteristics of the color filter section 19, also shown in FIG. 11, and the spectrum of the wavelengths of each of the red light, green light and the blue light, emitted by the red light emitting diode 21R, green light emitting diode 21G and the blue light emitting diode 21B, respectively. Ten of red light emitting diodes 21RN, having the peak wavelengths of (600+10N) nm, where N=0, 1, 2, ..., 7, 8, 9, were readied as the red light emitting diodes 21R.

Figure 13B:
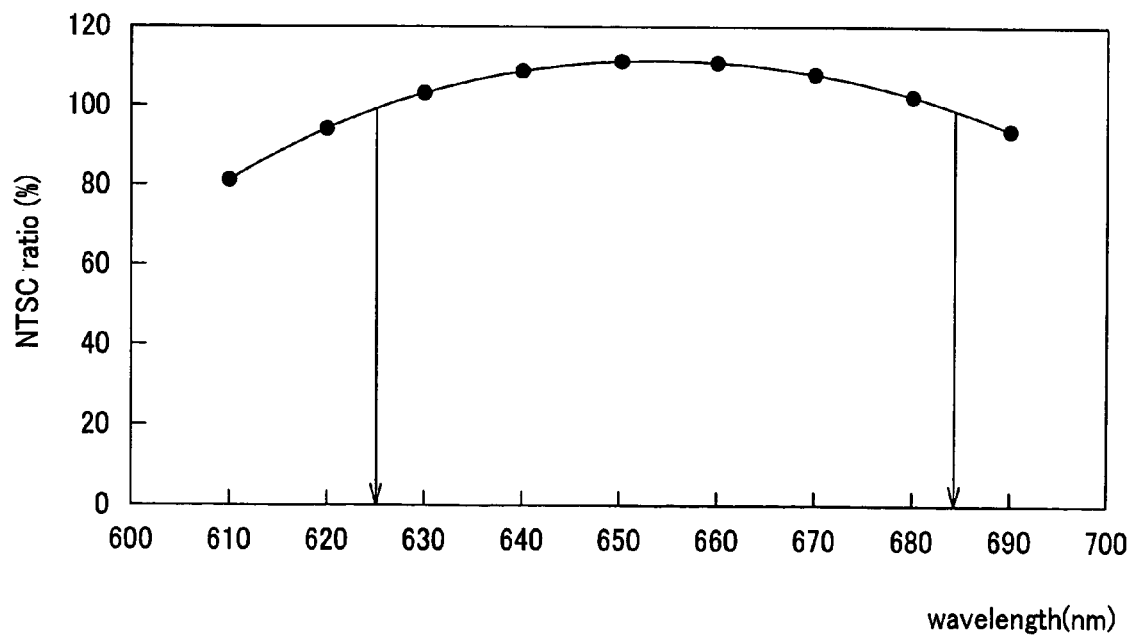
FIG. 13B is a graph showing the wavelength dependency of the NTSC ratio.

The graph of FIG. 13B shows the results of measurement of the NTSC ratio in case of employing the red light emitting diodes 21RN having the peak wavelengths of (600+10N) nm. Referring to FIG. 13B, the NTSC ratio is 100% or higher when the peak wavelength $\lambda pr$ of the red light emitting diodes 21RN is such that 625 nm$\leq \lambda pr \leq$685 nm.

Consequently, the optimum peak wavelength band of the red light emitting diode 21R is such that 625 nm$\leq \lambda pr \leq$685 nm.

[Green Light Emitting Diode 21G]

The peak wavelengths of the red light emitting diode 21R and the blue light emitting diode 21B are fixed and plural green light emitting diodes 21G with respective different peak wavelengths are readied. The NTSC ratio is measured for each of the sets of the three light emitting diodes to find an optimum peak wavelength band for the green light emitting diode 21G.

Figure 1:
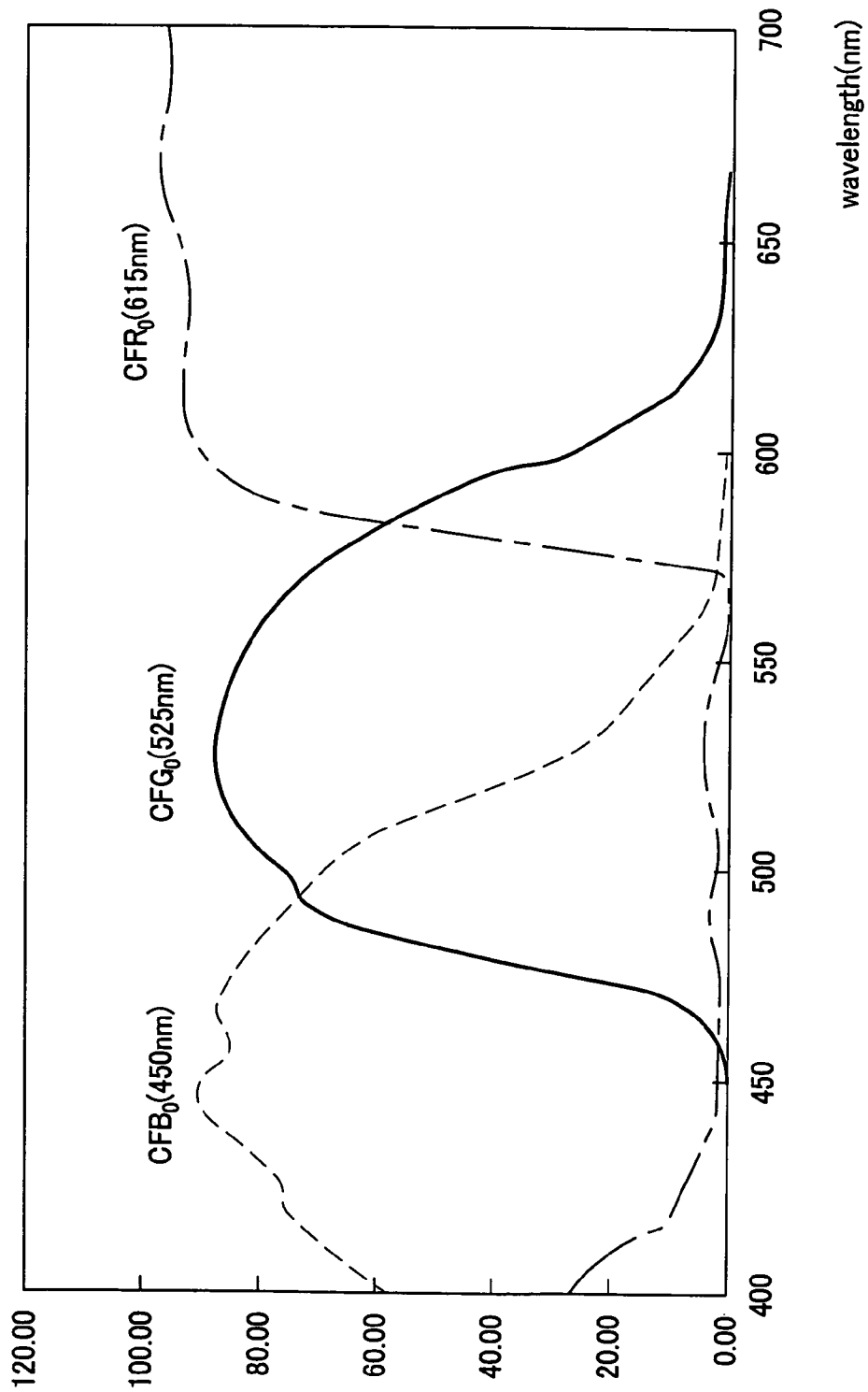
FIG. 1 is a graph showing spectral characteristics of respective color filters of a color liquid crystal display panel provided to a state-of-the-art color liquid crystal display.
Figure 2:
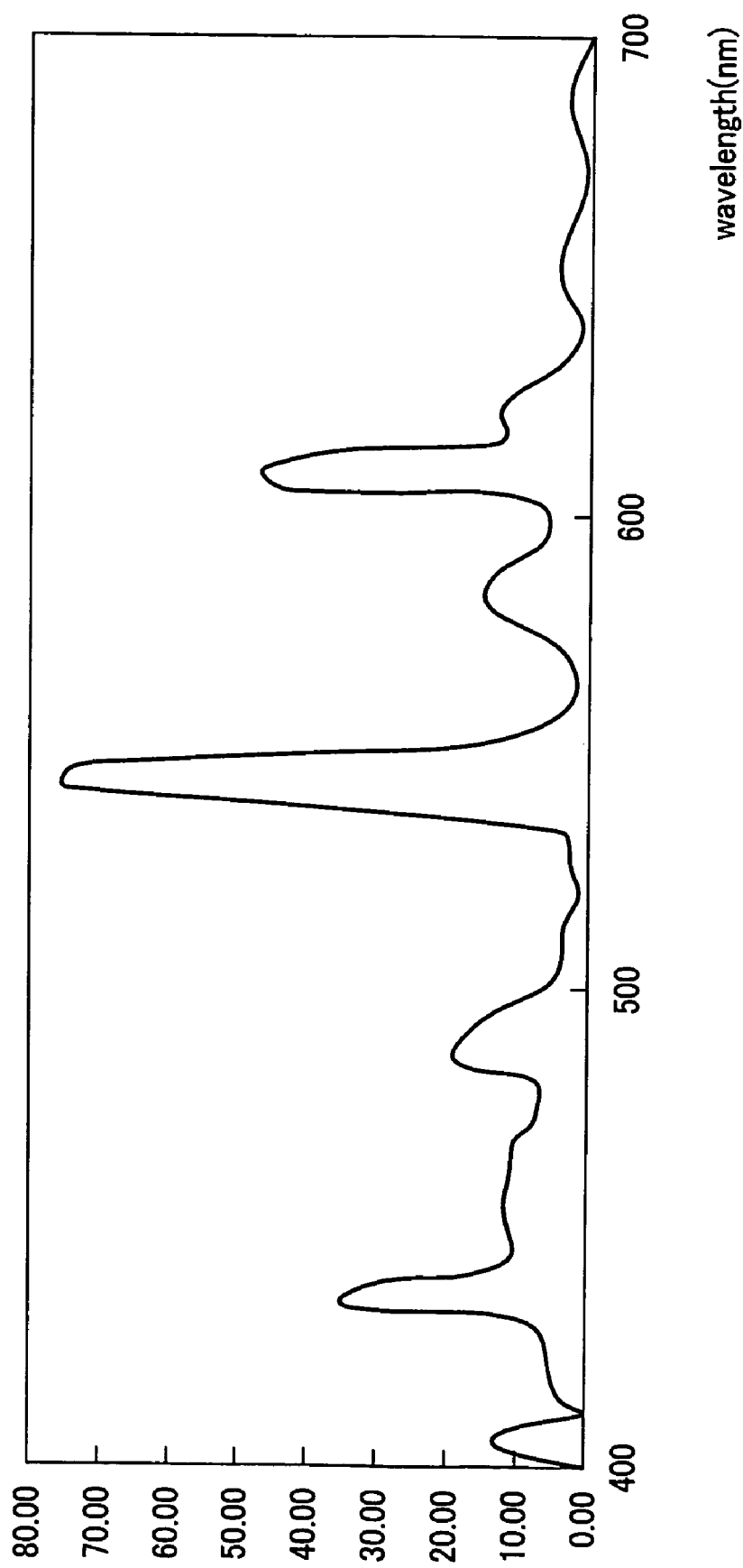
FIG. 2 is a graph showing the spectrum of a light source (CCFL) of a backlight device provided to a state-of-the-art color liquid crystal display.
Figure 3:
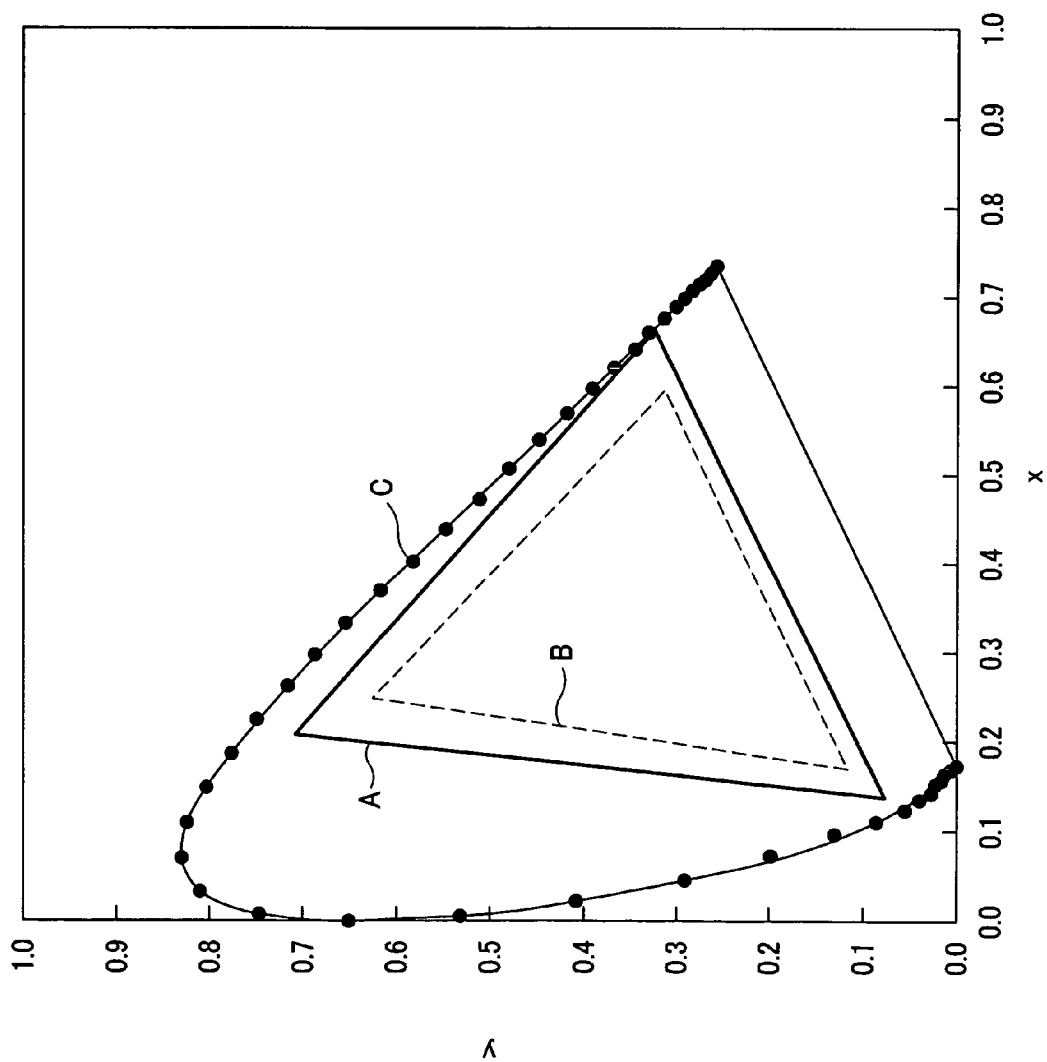
FIG. 3 is a graph showing a color reproducing range of a state-of-the-art color liquid crystal display, employing the CCFL as a light source of the backlight device, in the xy chromaticity diagram of the XYZ color system.
Figure 4:
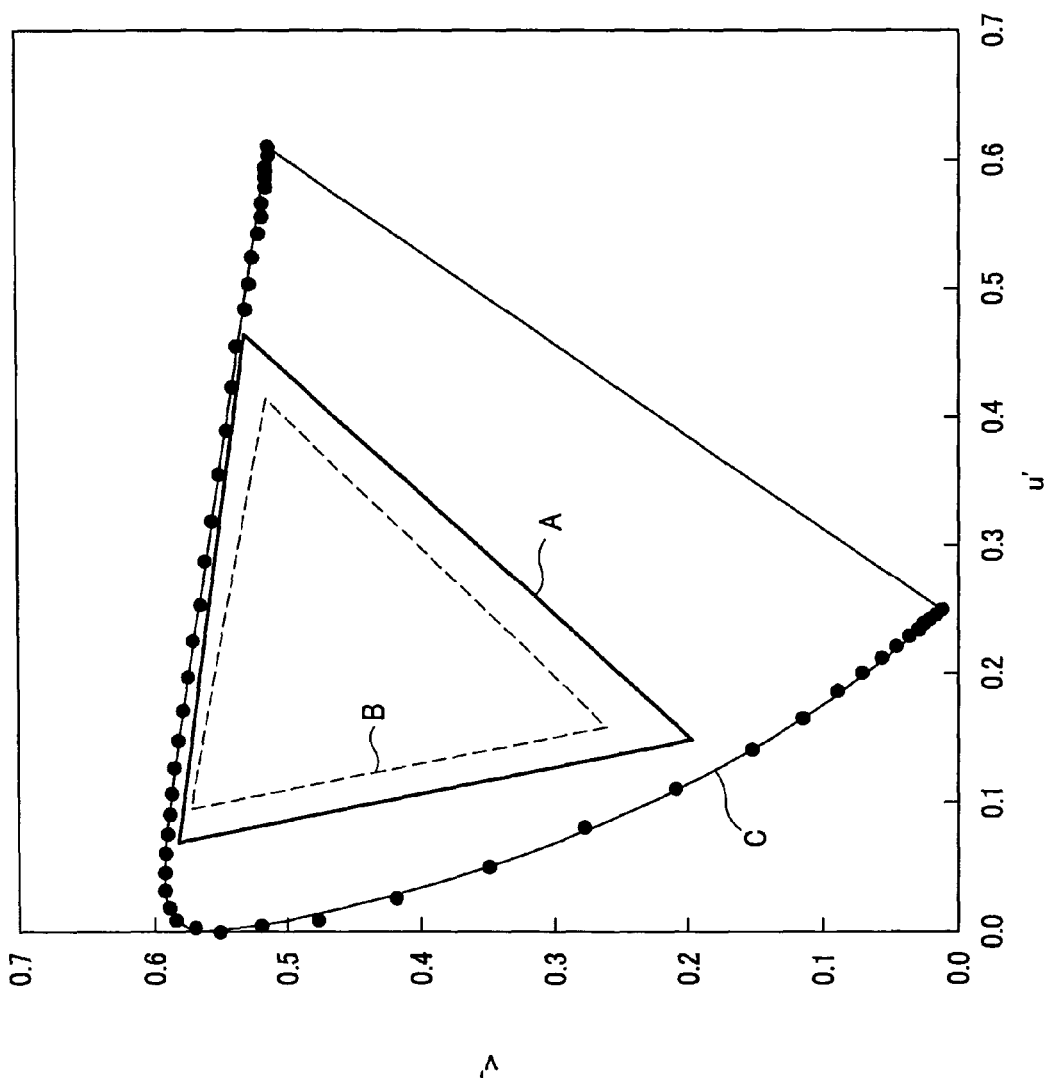
FIG. 4 is a graph showing a color reproducing range of a state-of-the-art color liquid crystal display, employing the CCFL as a light source of the backlight device, in the u'v' chromaticity diagram.
Figure 14A:
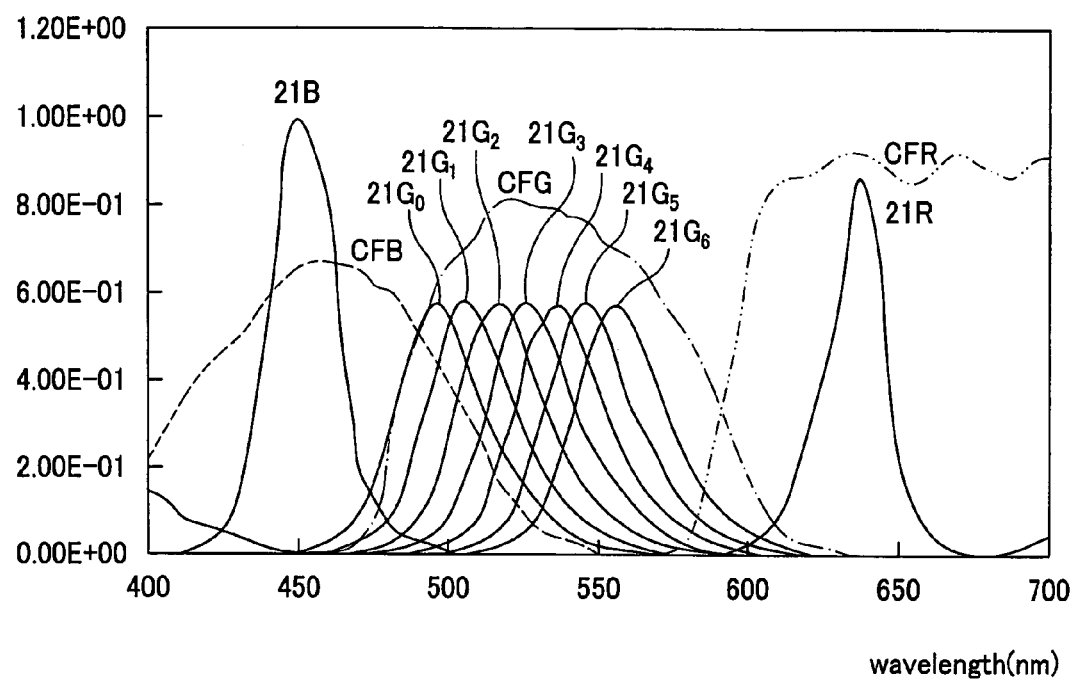
FIG. 14A is a graph showing spectral characteristics of each color filter and the spectrum of light radiated by each light emitting diode in case the peak wavelength band of a green light emitting diode is varied.

The graph of FIG. 14A shows spectral characteristics of the color filter section 19, also shown in FIG. 1, and the spectrum of the wavelength of each of the red light, green light and the blue light, emitted by the red light emitting diode 21R, green light emitting diode 21G and the blue light emitting diode 21B, respectively. Seven of green light emitting diodes 21GN, having the peak wavelengths of (495+10N) nm, where N=0, 1, 2, ..., 7, 8, 9, were readied as the green light emitting diodes 21G.

Figure 14B:
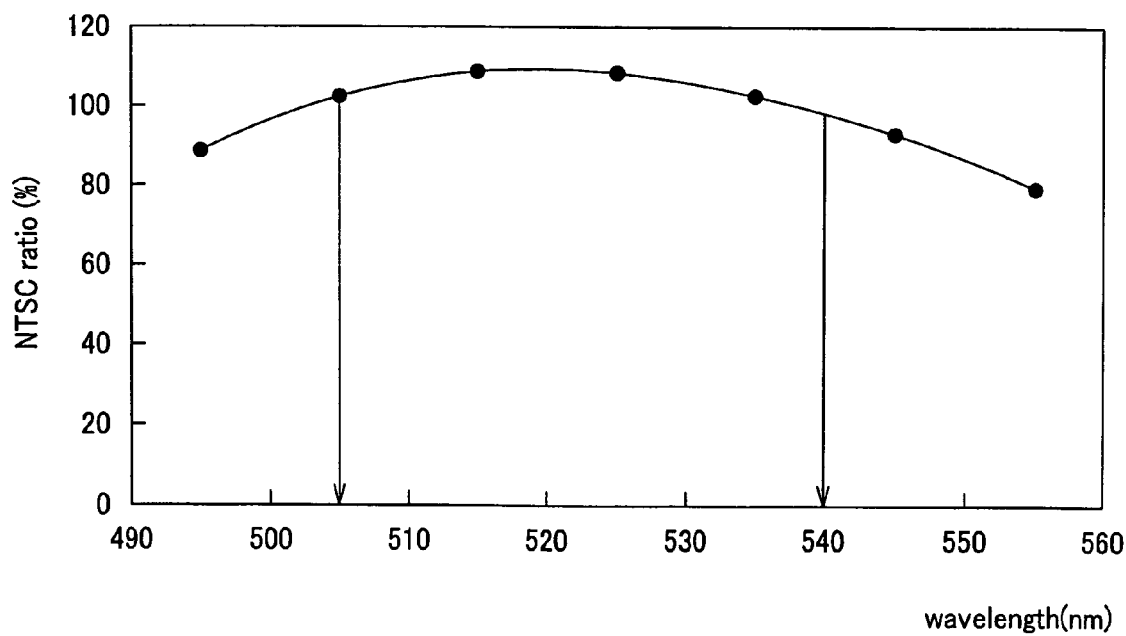
FIG. 14B is a graph showing the wavelength dependency of the NTSC ratio in case the peak wavelength band of the green light emitting diode is varied.

The graph of FIG. 14B shows the measured results of the NTSC ratio in case of employing the green light emitting diodes 21GN having the peak wavelengths of (495+10N) nm. Referring to FIG. 14B, the NTSC ratio is 100% or higher when the peak wavelength λpg of the green light emitting diodes 21GN is such that 505 nm≦λpg≦540 nm.

Consequently, the optimum peak wavelength band of the green light emitting diode 21C is such that 505 nm≦λpg≦540 nm.

[Blue Light Emitting Diode 21B]

The peak wavelengths of the red light emitting diode 21R and the green light emitting diode 21G are fixed and plural blue light emitting diodes 21B with respective different peak wavelengths are readied. The NTSC ratio is measured for each of the sets of the three light emitting diodes to find an optimum peak wavelength band for the blue light emitting diode 21B.

Figure 15A:
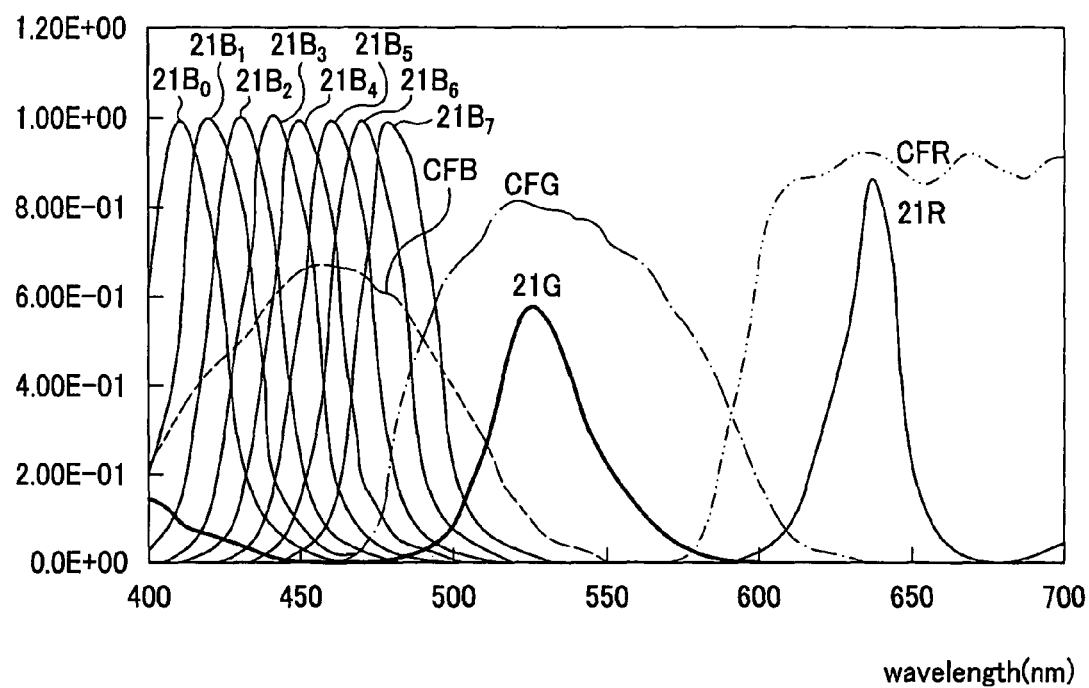
FIG. 15A is a graph showing spectral characteristics of each color filter and the spectrum of light radiated by each light emitting diode in case the peak wavelength band of a blue light emitting diode is varied.

The graph of FIG. 15A shows spectral characteristics of the color filter section 19, also shown in FIG. 11, and the spectrum of the wavelength of each of the red light, green light and the blue light, emitted by the red light emitting diode 21R, green light emitting diode 21G and the blue light emitting diode 21B, respectively. Eight of blue light emitting diodes 21BN, having the peak wavelengths of (410+10N) nm, where N=0, 1, 2, . . . , 5, 6, 7, were readied as the blue light emitting diodes 21B.

Figure 15B:
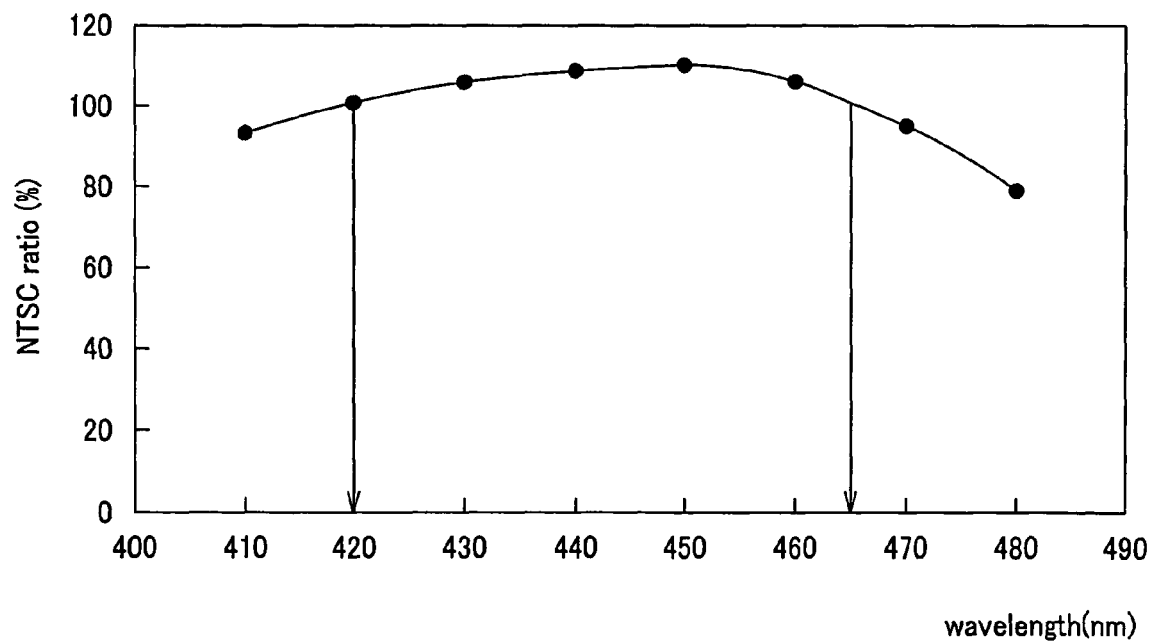
FIG. 15B is a graph showing the wavelength dependency of the NTSC ratio in case the peak wavelength band of the blue light emitting diode is varied.

The graph of FIG. 15B shows the results of measurement of the NTSC ratio in case of employing the green light emitting diodes 21GN having the peak wavelengths of (410+10N) nm. Referring to FIG. 15B, the NTSC ratio is 100% or higher when the peak wavelength λpb of the green light emitting diodes 21BN is such that 420 nm≦λpb≦465 nm.

Consequently, the optimum peak wavelength band of the blue light emitting diode 21B is such that 420 nm≦λpb≦465 nm.

Thus, by setting the peak wavelengths of the red light, green light and the blue light, emitted by the red light emitting diode 21R, green light emitting diode 21G and the blue light emitting diode 21B, respectively, so as to be in the above ranges, the white light, radiated from the backlight device 20, may be improved in color purity, while the color gamut may be broader than in case of using the CCFL, shown as the related art, as the light source. The result is the broader color reproducing range of the color liquid crystal display 100.

The color reproducing range in case the red light, green light and the blue light, emitted by the red light emitting diode 21R, green light emitting diode 21G and the blue light emitting diode 21B, respectively, are comprised within the aforementioned peak wavelength ranges, will now be verified, using a 768-color color chart, prepared in accordance with a Munsell color system. This color chart, also termed a Munsell color cascade, is a color system devised by an American painter A. H. Munsell (1858-1918).

The Munsell color cascade is a color chart for 16 gray levels and 48 color tints (16×48=768), formulated with the colors of the color materials with the maximum saturation as color chips. Specifically, the Munsell color cascade is a color system in which color elements are arrayed so that each color element corresponds to a point in a three-dimensional coordinate system in accordance with three color attributes, that is, color tints, saturation and luminance.

FIGS. 16 and 17 depict the xy chromaticity diagram and the u'v' chromaticity diagram of an XYZ color system, as provided for by the Commission Internationale de l'Eclaiage (CIE), respectively. These diagrams show the color reproducing ranges of the color liquid crystal display 100 having a backlight device 20 including the light emitting diodes 21 as light sources. The sets of coordinate values of the aforementioned color chart are plotted as (□) in the chromaticity diagrams. More specifically, FIGS. 16 and 17 each show the color reproducing range of the color liquid crystal display 100 defined by a triangle in each chromaticity diagram. The triangle is delimited by the peak wavelength ranges of the respective light emitting diodes, namely the range of 625 nm≦λpr≦685 nm for the red light emitting diode 21R, the range of 505 nm≦λpg≦540 nm for the green light emitting diode 21G and the range of 420 nm≦λpb≦465 nm for the blue light emitting diode 21B. The color reproducing range which becomes narrowest from the above range is comprised within a triangle in each chromaticity diagram.

The Munsell color cascade may be thought of as a color chart which is an envelope of color cubes within the color gamut of an actually existing object. The color cubes are each defined by sets of coordinate values in a three-dimensional space delimited by three elements of the color of the object, namely the color tint, saturation and hue. Hence, in evaluating the color reproducing range of the color display, such as the color liquid crystal display 100, it is crucial to verify to which extent the sets of the coordinate values of the color chart are contained in the color reproducing range of the color display being evaluated, such as the color liquid crystal display 100.

It is seen from FIGS. 16 and 17 that the peak wavelength ranges of the respective light emitting diodes, realizing not less than 100% of the aforementioned NTSC diagram, may substantially comprise the coordinate values of the color chart, defined as the Munsell color cascade, even in such case where the color reproducing range becomes narrowest in the above-defined peak wavelength ranges. Consequently, with the color liquid crystal display 100, it is possible to reproduce the clear colors which are also excellent as long as the visual sense is concerned.

In FIGS. 16 and 17, the reference symbol D denotes the range of color reproduction as provided for by the Commission Internationale de l'Eclaiage (CIE), and the reference symbol E denotes the range of color reproduction of the color liquid crystal display 100 according to the present invention.

It should be understood by those skilled in the art that various modifications, combinations, sub-combinations and alterations may occur depending on design requirements and other factors insofar as they are within the scope of the appended claims or the equivalents thereof.

The invention claimed is:

1. A backlight device for illuminating with a white light, the backlight device comprising:

a transmissive color liquid crystal display panel from a back side of the backlight device, the transmissive color liquid crystal display panel including a color filter employing a red light color filter, a green light color filter, and a blue light color filter;

a light source including a plurality of red light emitting diodes for radiating red light, each red light emitting diode having a peak wavelength λpr such that 625 nm ≦λpr ≦685 nm, a plurality of green light emitting diodes for radiating green light, each green light emitting diode having a peak wavelength λpg such that 505 nm≦λpg≦540 nm, and a plurality of blue light emitting diodes for radiating blue light, each blue light emitting diode having a peak wavelength λpb such that 420 nm≦λpb≦465 nm;

a mixing means for color mixing the red light, the green light and the blue light, radiated from the light source, to generate white light;

wherein a light emission intensity of the red light, the green light and the blue light, radiated from the red light emitting diode, the green light emitting diode and the blue light emitting diode, respectively, is adjusted so that a half value width hwr of a spectrum of the red light, a half value width hwg of a spectrum of the green light and a half value width hwb of a spectrum of the blue light are such that 20 nm $\leqq$ hwr $\leqq$ 25 nm, 30 nm $\leqq$ hwg $\leqq$ 40 nm and 25 nm $\leqq$ hwb $\leqq$ 30 nm, respectively, wherein the half value width hwb of the spectrum of the blue light is, on average, about 5 nm wider than the half value width hwr of the spectrum of the red light, and wherein a ratio of peak intensity of the red light, the green light, and the blue light is about 0.9:0.6:1.

2. The backlight device according to claim 1 wherein a light emission intensity of the red light, the green light and the blue light, radiated from the red light emitting diode, the green light emitting diode and the blue light emitting diode, respectively, is adjusted so that a color temperature of the white light is 10000±1000 K (Kelvin).

3. The backlight device according to claim 1 wherein a plurality of red light emitting diodes, each red light emitting diode having a peak wavelength $\lambda$pr such that 625 nm $\leqq$ $\lambda$pr $\leqq$ 685 nm and having different values of the peak wavelength $\lambda$pr, are used as the red light emitting diode used for the light source.

4. The backlight device according to claim 1 wherein a plurality of green light emitting diodes, each green light emitting diode having a peak wavelength $\lambda$pg such that 505 nm $\leqq$ $\lambda$pg $\leqq$ 540 nm and having different values of the peak wavelength $\lambda$pg, are used as the green light emitting diode used for the light source.

5. The backlight device according to claim 1 wherein a plurality of blue light emitting diodes, each blue light emitting diode having a peak wavelength $\lambda$pb such that 420 nm $\leqq$ $\lambda$pb $\leqq$ 465 nm and having different values of the peak wavelength $\lambda$pb, are used as the blue light emitting diode used for the light source.

6. The backlight device according to claim 1, wherein the light source radiates only three peaks of light.

7. A color liquid crystal display, comprising:
a transmissive color liquid crystal display panel having a main color filter employing three color filters for transmitting red light, green light and blue light by wavelength selection;
a backlight device for illuminating, with white light, the color liquid crystal display panel from a back side thereof, wherein the backlight device further comprises:
a light source including a plurality of red light emitting diodes for radiating red light, each red light emitting diode having a peak wavelength $\lambda$pr such that 625 nm $\leqq$ $\lambda$pr $\leqq$ 685 nm, a plurality of green light emitting diodes for radiating green light, each green light emitting diode having a peak wavelength $\lambda$pg such that 505 nm $\leqq$ $\lambda$pg $\leqq$ 540 nm, and a plurality of blue light emitting diodes for radiating blue light, each blue light emitting diode having a peak wavelength $\lambda$pb such that 420 nm $\leqq$ $\lambda$pb $\leqq$ 465 nm;
a mixing means for color mixing the red light, the green light and the blue light, radiated from the light source, to generate white light;
wherein a light emission intensity of the red light, the green light and the blue light, radiated from the red light emitting diode, the green light emitting diode and the blue light emitting diode, respectively, is adjusted so that a half value width hwr of a spectrum of the red light, a half value width hwg of a spectrum of the green light and a half value width hwb of a spectrum of the blue light are such that 20 nm $\leqq$ hwr $\leqq$ 25 nm, 30 nm $\leqq$ hwg $\leqq$ 40 nm and 25 nm $\leqq$ hwb $\leqq$ 30 nm, respectively, wherein the half value width hwb of the spectrum of the blue light is, on average, about 5 nm wider than the half value width hwr of the spectrum of the red light, and wherein a ratio of peak intensity of the red light, the green light, and the blue light is about 0.9:0.6:1.

8. The color liquid crystal display according to claim 7 wherein a light emission intensity of the red light, the green light and the blue light, radiated from the red light emitting diode, the green light emitting diode and the blue light emitting diode, respectively, is adjusted so that a color temperature of the white light is 10000±1000 K (Kelvin).

9. The color liquid crystal display according to claim 7 wherein a plurality of red light emitting diodes, each red light emitting diode having a peak wavelength $\lambda$pr such that 625 nm $\leqq$ $\lambda$pr $\leqq$ 685 nm and having different values of the peak wavelength $\lambda$pr, are used as the red light emitting diode used for the light source.

10. The color liquid crystal display according to claim 7 wherein a plurality of green light emitting diodes, each red light emitting diode having a peak wavelength $\lambda$pg such that 505 nm $\leqq$ $\lambda$pg $\leqq$ 540 nm and having different values of the peak wavelength $\lambda$pg, are used as the green light emitting diode used for the light source.

11. The color liquid crystal display according to claim 7 wherein a plurality of blue light emitting diodes, each blue light emitting diode having a peak wavelength $\lambda$pb such that 420 nm $\leqq$ $\lambda$pb $\leqq$ 465 nm and having different values of the peak wavelength $\lambda$pb, are used as the blue light emitting diode used for the light source.

12. The backlight device according to claim 7, wherein the light source radiates only three peaks of light.

* * * * *